US011936249B2

(12) United States Patent
Embo et al.

(10) Patent No.: US 11,936,249 B2
(45) Date of Patent: Mar. 19, 2024

(54) MEASUREMENT SYSTEM, ELECTRICAL MACHINE AND METHOD FOR PRODUCING AN ELECTRICAL MACHINE OF THIS KIND

(71) Applicants: TE Connectivity India Private Limited, Bangalore (IN); TE Connectivity Germany GmbH, Bensheim (DE); Volkswagen AG, Wolfsburg (DE); TE Connectivity Belgium BV, Oostkamp (BE)

(72) Inventors: Bram Embo, Oostkamp (BE); Dirk Pillu, Oostkamp (BE); Rainer Schindel, Bensheim (DE); Sebastian Wiechert, Speyer (DE); Mathias Dohmann, Wolfsburg (DE); Manivasakan Ravinthiran, Bangalore (IN)

(73) Assignees: TE Connectivity India Private Limited, Bangalore (IN); TE Connectivity Germany GmbH, Bensheim (DE); Volkswagen AG, Wolfsburg (DE); TE Connectivity Begium BV, Oostkamp (BE)

( * ) Notice: Subject to any disclaimer, the term of this patent is extended or adjusted under 35 U.S.C. 154(b) by 134 days.

(21) Appl. No.: 17/558,988

(22) Filed: Dec. 22, 2021

(65) Prior Publication Data
US 2022/0115931 A1 Apr. 14, 2022

Related U.S. Application Data

(63) Continuation of application No. PCT/EP2020/062991, filed on May 11, 2020.

(30) Foreign Application Priority Data

Jun. 26, 2019 (IN) .............................. 201941025355

(51) Int. Cl.
H02K 11/21 (2016.01)
H02K 5/00 (2006.01)
(Continued)

(52) U.S. Cl.
CPC ................ *H02K 11/21* (2016.01); *H02K 5/00* (2013.01); *H02K 11/25* (2016.01); *H02K 15/00* (2013.01)

(58) Field of Classification Search
CPC .......... H02K 11/21; H02K 11/25; H02K 5/00; H02K 15/00
(Continued)

(56) References Cited

U.S. PATENT DOCUMENTS

2017/0019001 A1\* 1/2017 Budaker ................ H02K 5/225

FOREIGN PATENT DOCUMENTS

DE 10 2012 016 913 A1 3/2014
DE 102012016913 A1 \* 3/2014 ............. H02K 11/25
(Continued)

OTHER PUBLICATIONS

PCT Written Opinion of the International Searching Authority, and International Search Report, Intl App No. PCT/EP2020/062991, dated Aug. 11, 2020, 8 pages.

*Primary Examiner* — Jose A Gonzalez Quinones
(74) *Attorney, Agent, or Firm* — Barley Snyder

(57) ABSTRACT

A measurement system for an electrical machine includes a position sensor device arranged on a rotor of the electrical machine, a carrier connected to the position sensor device, and a temperature sensor device fastened to the carrier. The position sensor device is configured to ascertain an item of information about an orientation of the rotor. The temperature sensor is configured to ascertain a temperature of a stator of the electrical machine.

19 Claims, 19 Drawing Sheets

(51) Int. Cl.
*H02K 11/25* (2016.01)
*H02K 15/00* (2006.01)

(58) Field of Classification Search
USPC .............................................. 310/68 B, 68 C
See application file for complete search history.

(56) References Cited

FOREIGN PATENT DOCUMENTS

| | | |
|---|---|---|
| DE | 10 2015 213 043 A1 | 1/2017 |
| GB | 2536594 A | 9/2016 |
| JP | 200423326 A | 1/2004 |

* cited by examiner

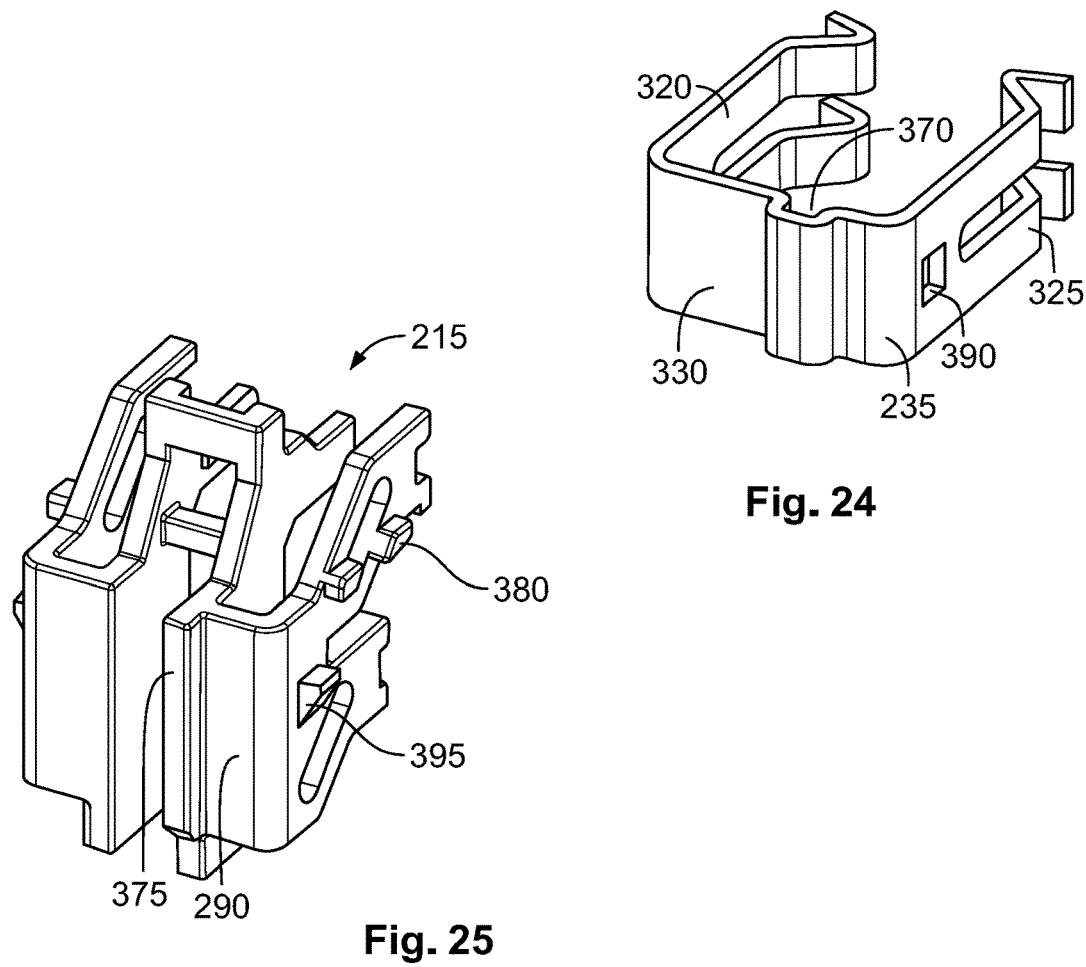
Fig. 24
Fig. 25
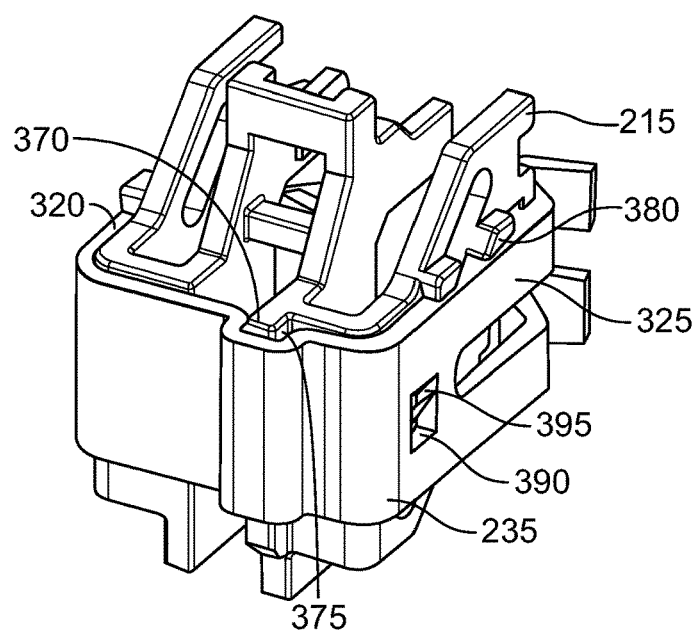
Fig. 26

MEASUREMENT SYSTEM, ELECTRICAL MACHINE AND METHOD FOR PRODUCING AN ELECTRICAL MACHINE OF THIS KIND

CROSS-REFERENCE TO RELATED APPLICATIONS

This application is a continuation of PCT International Application No. PCT/EP2020/062991, filed on May 11, 2020, which claims priority under 35 U.S.C. § 119 to Indian Patent Application No. 201941025355, filed on Jun. 26, 2019.

FIELD OF THE INVENTION

The present invention relates to an electrical machine and, more particularly, to a measurement system for an electrical machine.

BACKGROUND

Measurement systems are commonly used for measuring elements of electrical machines. Japanese Patent Application No. JP 2004-23326, for example, discloses a moisture-stable temperature sensor.

SUMMARY

A measurement system for an electrical machine includes a position sensor device arranged on a rotor of the electrical machine, a carrier connected to the position sensor device, and a temperature sensor device fastened to the carrier. The position sensor device is configured to ascertain an item of information about an orientation of the rotor. The temperature sensor is configured to ascertain a temperature of a stator of the electrical machine.

BRIEF DESCRIPTION OF THE DRAWINGS

The invention will now be described by way of example with reference to the accompanying Figures, of which:

FIG. 24 is a perspective view of a securing element according to a fourth embodiment;

FIG. 25 is a perspective view of a sensor holder according to a fourth embodiment; and FIG. 26 is a perspective view of the securing element of FIG. 24 on the sensor holder of FIG. 25 in a mounted state.

DETAILED DESCRIPTION OF THE EMBODIMENT(S)

The accompanying drawings are incorporated into the specification and form a part of the specification to illustrate several embodiments of the present invention. These drawings, together with the description, explain the principles of the invention. The drawings are merely for the purpose of illustrating examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings, in which like references refer to like elements.

Figure 1:
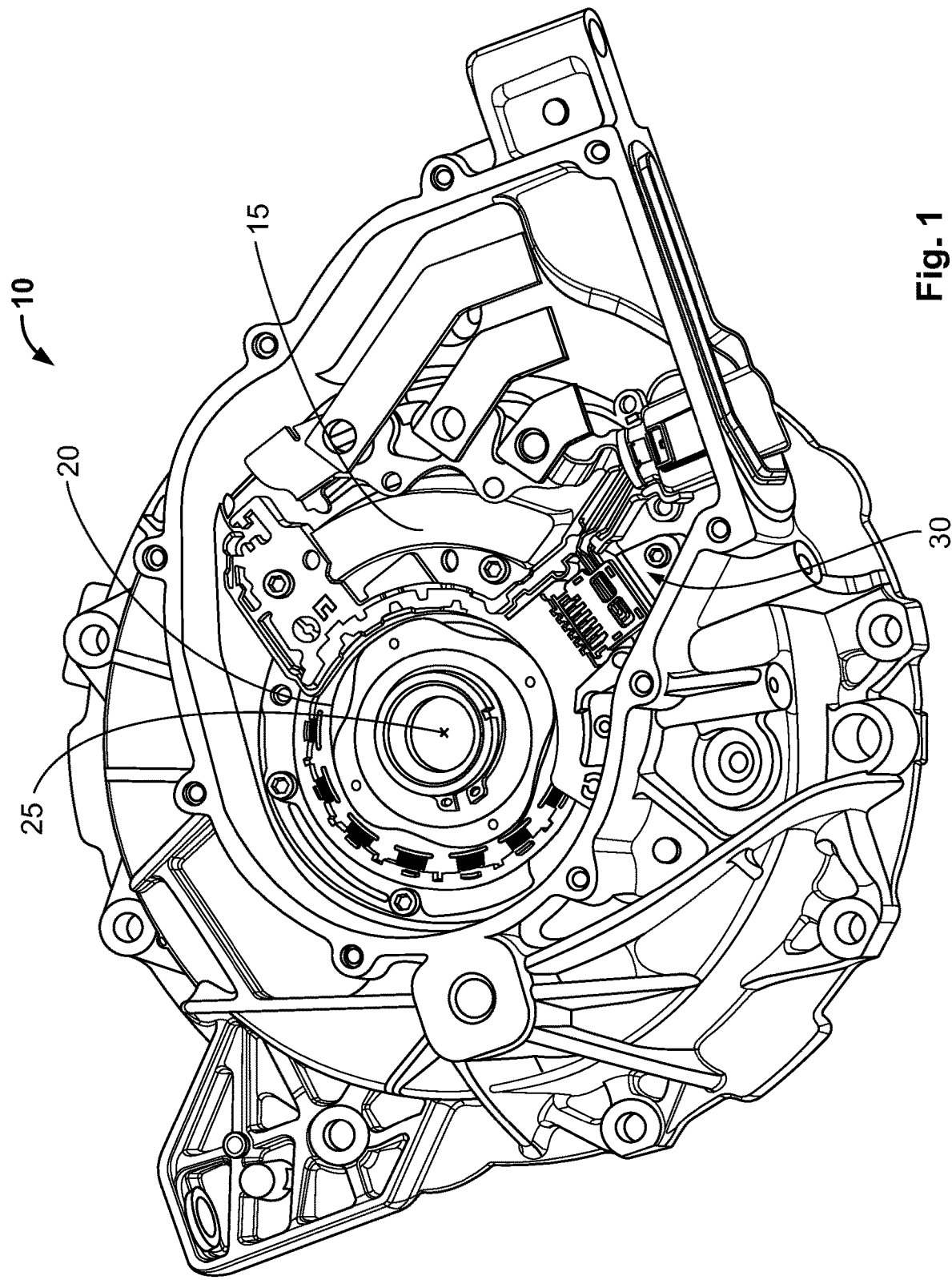
FIG. 1 is a perspective view of an electrical machine according to an embodiment.

An electrical machine 10 according to an embodiment is shown in FIG. 1. The electrical machine 10 comprises a stator 15, a rotor 20, which is mounted such that it can rotate about a rotation axis 25, and a measurement system 30. The electrical machine 10 is configured, for example, as a brushless DC motor or as a synchronous machine. The electrical machine can serve to drive a vehicle, in particular a motor vehicle. The electrical machine can also be operated as a generator.

The rotor 20 shown in FIG. 1 is mounted such that it can rotate about the rotation axis 25, wherein, by way of example, the rotor 20 can comprise a large number of permanent magnets which are arranged around the rotation axis 25 in the circumferential direction. A magnetic field is generated depending on an application of current to the windings 35, shown in FIG. 2, which magnetic field drives the rotor 20 in interaction with the magnetic field of the rotor 20. During operation of the stator 15, both the windings 35 and also, in association, the stator rim 40 and the stator element 45 described in detail below heat up on account of an internal resistance of the windings 35. In order to prevent thermal damage to the windings 35, overheating of the windings 35 should be prevented.

Figure 2:
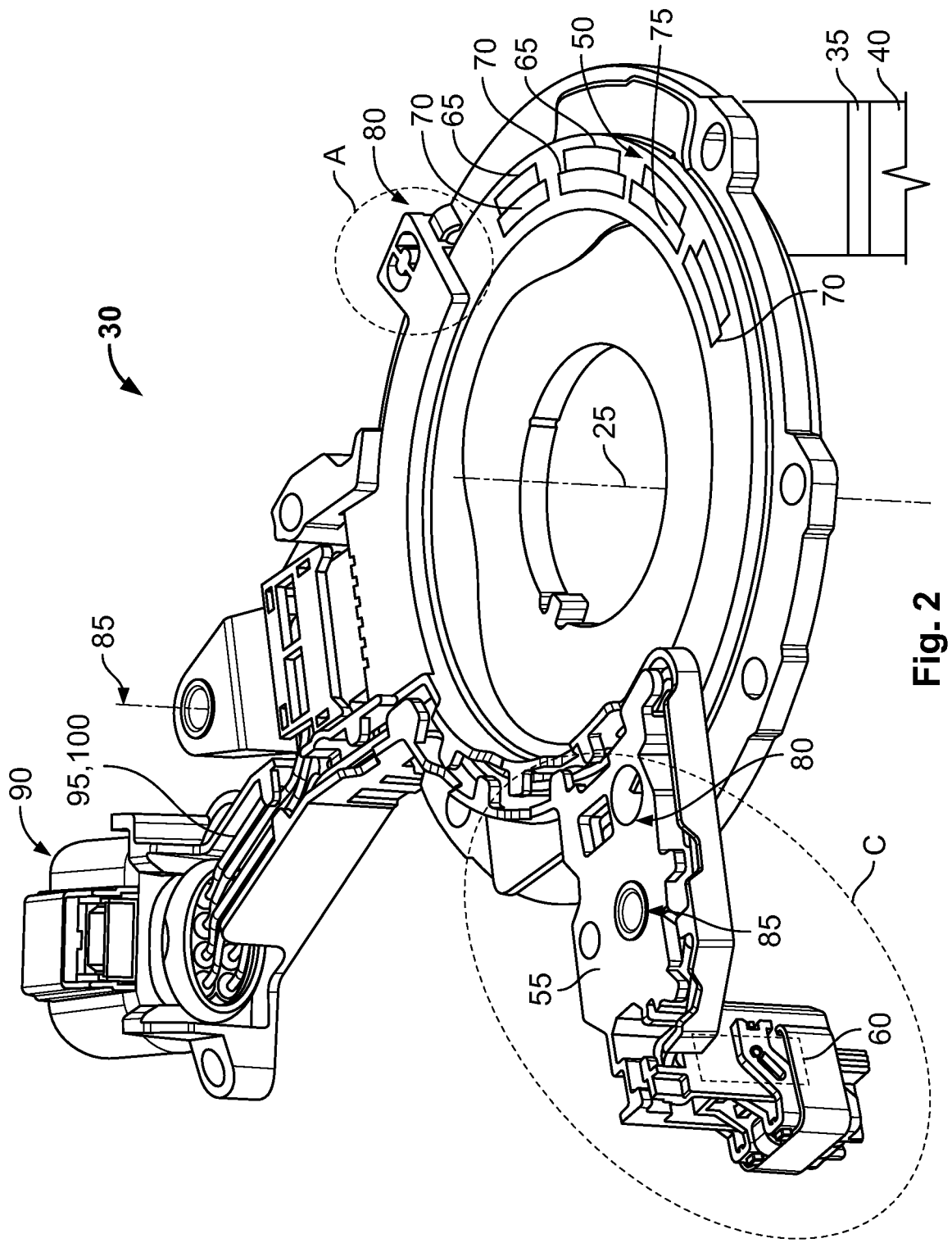
FIG. 2 is a perspective view of a measurement system of the electrical machine of FIG. 1.

The measurement system 30 of the electrical machine 10 is shown in FIG. 2. The stator 15 comprises a large number of windings 35 (schematically indicated in FIG. 2), which are arranged in the stator 15 around the rotation axis 25 in the circumferential direction. Furthermore, the stator 15 comprises a stator rim 40. The stator rim 40 can comprise one or more stator teeth, wherein the windings 35 are wound around in each case at least one stator tooth.

Figure 7:
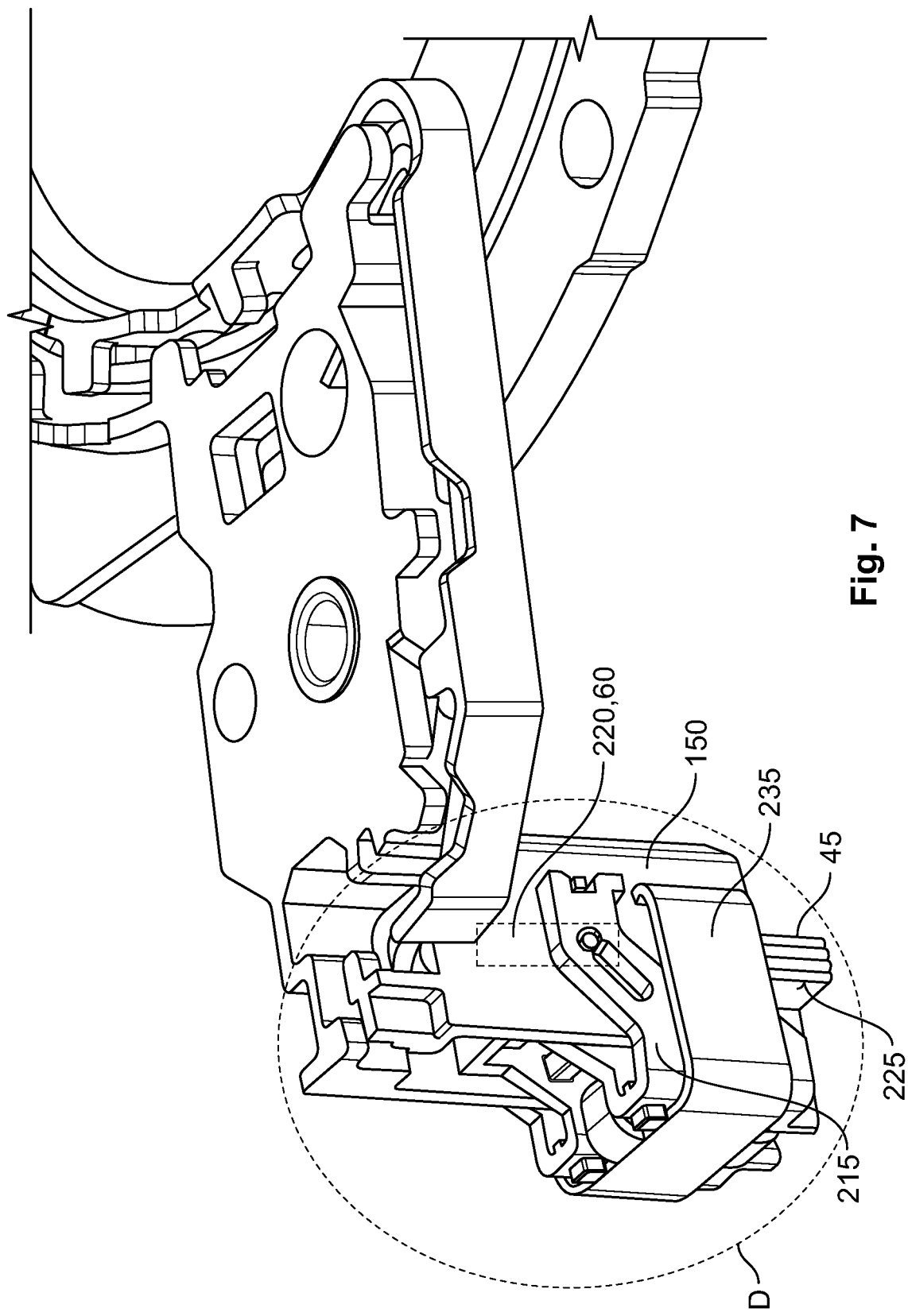
FIG. 7 is a perspective view of a detail C of the measurement system of FIG. 2.

The stator 15 comprises a stator element 45, as shown in FIG. 7, for example a stator lug, which is of plate-like design and extends parallel in relation to the rotation axis 25. The stator element 45 is configured, for example, in one piece and from the same material as the stator rim 40. As an alternative, the stator rim 40 and the stator element 45 can also be of multipartite configuration, wherein the stator element 45 is thermally connected to the windings 35 via the stator rim 40.

The measurement system 30 is arranged axially next to the stator 15 with respect to the rotation axis 25 and is mechanically connected to the stator 15. As shown in FIG. 2, the measurement system 30 comprises a position sensor device 50 and a carrier 55, which is connected to the position sensor device 50, and a temperature sensor device 60.

As shown in FIG. 2, the position sensor device 50 comprises a large number of coils 65 which are arranged around the rotation axis 25 in the circumferential direction. The coils 65 are each wound around a coil tooth 70 of the position sensor device 50, which coil tooth 70 is arranged radially on the inside of a coil rim 75 of the position sensor device 50. The coil rim 75 is configured, by way of example, so as to run substantially in the form of a ring around the rotation axis 25. In this case, the coil rim 75 can be configured in one or several pieces. The carrier 55 is connected to the coil rim 75, by way of example, in an interlocking manner by a first fastening device 80. Whereas the carrier 55 is produced from a thermally poorly conductive material, for example plastic, which is advantageously electrically insulating, the coil rim 75 is manufactured from a metal by way of example.

The temperature sensor device 60 is arranged offset in relation to the position sensor device 50 radially on the outside and is fastened to the carrier 55, as shown in FIG. 2. In this case, by way of example, the temperature sensor device 60 can comprise, for example, an NTC (Negative Temperature Coefficient Thermistor) temperature sensor as the temperature sensor. In the state in which the carrier 55 is mounted in the electrical machine 10, the measurement system 30 is fastened by a second fastening device 85, for example, to the stator 15, for example by screws, such that it can be released without being destroyed.

As shown in FIG. 2, the measurement system 30 comprises a contact device 90 which is configured, by way of example, as a multi-pole socket contact in the embodiment. The contact device 90 is electrically connected to the temperature sensor device 60 by a first electrical connection 95. The position sensor device 50 can be connected to the contact device 90, for example, by a second electrical connection 100. The contact device 90 can be connected in a reversibly releasable interlocking manner to the carrier 55, without a complicated configuration of the carrier 55 being required in the process. Furthermore, this configuration is particularly suitable for producing the carrier 55, for example, using an injection-molding process.

The first and/or the second electrical connection 95, 100 can comprise at least one electrical cable, for example a plurality of electrical cables, with in each case one electrical conductor. The electrical conductor can be configured as a fine or extremely fine wire, so that the electrical cable of the first electrical connection 95 and/or second electrical connection 100 can be laid around particularly narrow radii of curvature in a simple manner. Furthermore, the fine and/or extremely fine wire design of the electrical conductor of the first and/or second electrical connection 95, 100 ensures that no cable fracture in the electrical connection 95, 100 occurs due to vibrations.

The first electrical connection 95 and the second electrical connection 100 are fastened, for example, in a reversibly releasable manner to the carrier 55. As a result, a loose first and/or second electrical connection 95, 100 is avoided, and therefore damage to the first and/or second electrical connection 95, 100 can be effectively avoided. During operation of the electrical machine 10, the position sensor device 50 detects, for example, one or more signal elements which are arranged on the rotor 20. The signal element can be, for example, a separate permanent magnet or the permanent magnet for driving the rotor 20. The coils 65 are electrically connected to the contact device 90 via the second electrical connection 100. An item of information about an orientation of the rotor 20 relative to the stator 15 is ascertained via the coils 65, for example by detecting the signal element, and supplied to the contact device 90 via the second electrical connection 100.

The temperature sensor device 60 is thermally coupled to the stator element 45 and, via the stator element 45 and the stator rim 40, to the windings 35. If the windings 35 of the stator 15 heat up during operation of the electrical machine 10, a temperature of the windings 35 can be ascertained by the temperature sensor device 60 via the thermal coupling of the temperature sensor device 60 via the stator element 45 and the stator rim 40. In the process, the temperature sensor device 60 measures a temperature of the stator element 45 at the temperature sensor device 60. The temperature sensor device 60 supplies an appropriate corresponding temperature signal and/or an appropriate item of temperature information to the contact device 90 via the first electrical connection 95.

This configuration has the advantage that two important items of information about the electrical machine 10 can be ascertained in a simple manner using the measurement system 30, so that current can be supplied to the stator 15 on the basis of this information (temperature and orientation). This is particularly advantageous particularly in the case of a configuration of the electrical machine 10 as a brushless DC motor or as a synchronous machine, for example for driving a vehicle.

The contact device 90 can be connected to a controller for controlling the electrical machine 10 via further electrical lines, not illustrated, and/or a data bus, wherein the controller applies current to the windings 35 on the basis of the ascertained orientation of the rotor 20 relative to the stator 15. In this case, the controller can take into account the temperature signal or the temperature information, which is likewise provided to the contact device 90, when applying current to the windings 35 for driving the rotor 20.

Figure 3:
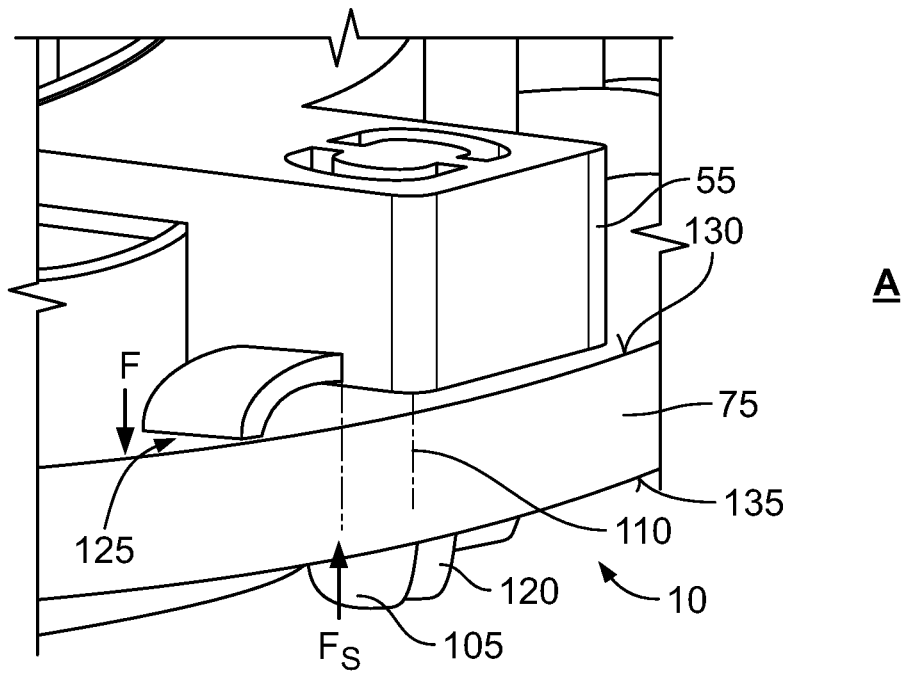
FIG. 3 is a perspective view of a detail A of the measurement system shown in FIG. 2.

FIG. 3 shows a detail A of the measurement system 30 shown in FIG. 2. The first fastening device 80 comprises a latching element 105, which is configured, by way of example, as a latching armature in the embodiment, and a fastening opening 110 which is arranged in the coil rim 75 and is configured so as to correspond to the latching element 105. The fastening opening 110 is configured as a passage opening and runs parallel in relation to the rotation axis 25. The fastening opening 110 can be configured, for example, as a bore.

Figure 4:
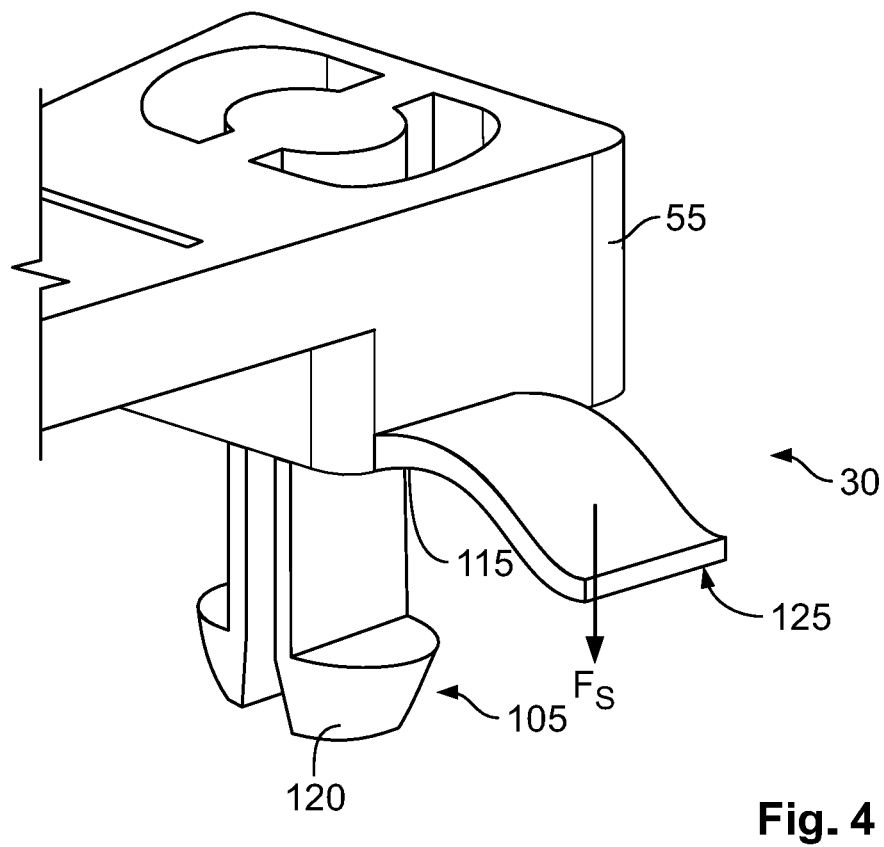
FIG. 4 is another perspective view of the detail A of the measurement system shown in FIG. 3.

FIG. 4 shows the detail A, shown in FIG. 2, of the measurement system 30. In the embodiment, the latching element 105 is configured as a latching armature and is connected, by way of a fixed end 115, to the carrier 55. The first latching element 105 extends substantially parallel in relation to the rotation axis 25. The latching element 105 comprises, at a free end, a first latching lug 120. In the mounted state, shown in FIG. 3, the latching element 105 passes through the fastening opening 110, wherein the first latching lug 120 engages behind the coil rim 75 on a side that is opposite from the carrier 55.

A tensioning device 125 (for example one or more beam springs, as shown in FIGS. 3 and 4) which is arranged transversely in relation to the first latching element 105 and is fastened to the carrier 55 can be arranged on the side of the carrier 55 in a manner adjacent to the latching element 105. The tensioning device 125 rests, at a free end, on a first end side 130 of the coil rim 75, which first end side is arranged on a side of the coil rim 75 that is opposite from the latching lug 120, and provides a tensioning force FS which acts against the first end side 130. The latching lug 120 is pulled towards a second end side 135 of the coil rim 75 by the tensioning force FS. The second end side 135 is arranged on the side that is opposite from the carrier 55 and the side that faces the stator 15. This prevents undesired release of the carrier 55 from the coil rim 75.

Figure 5:
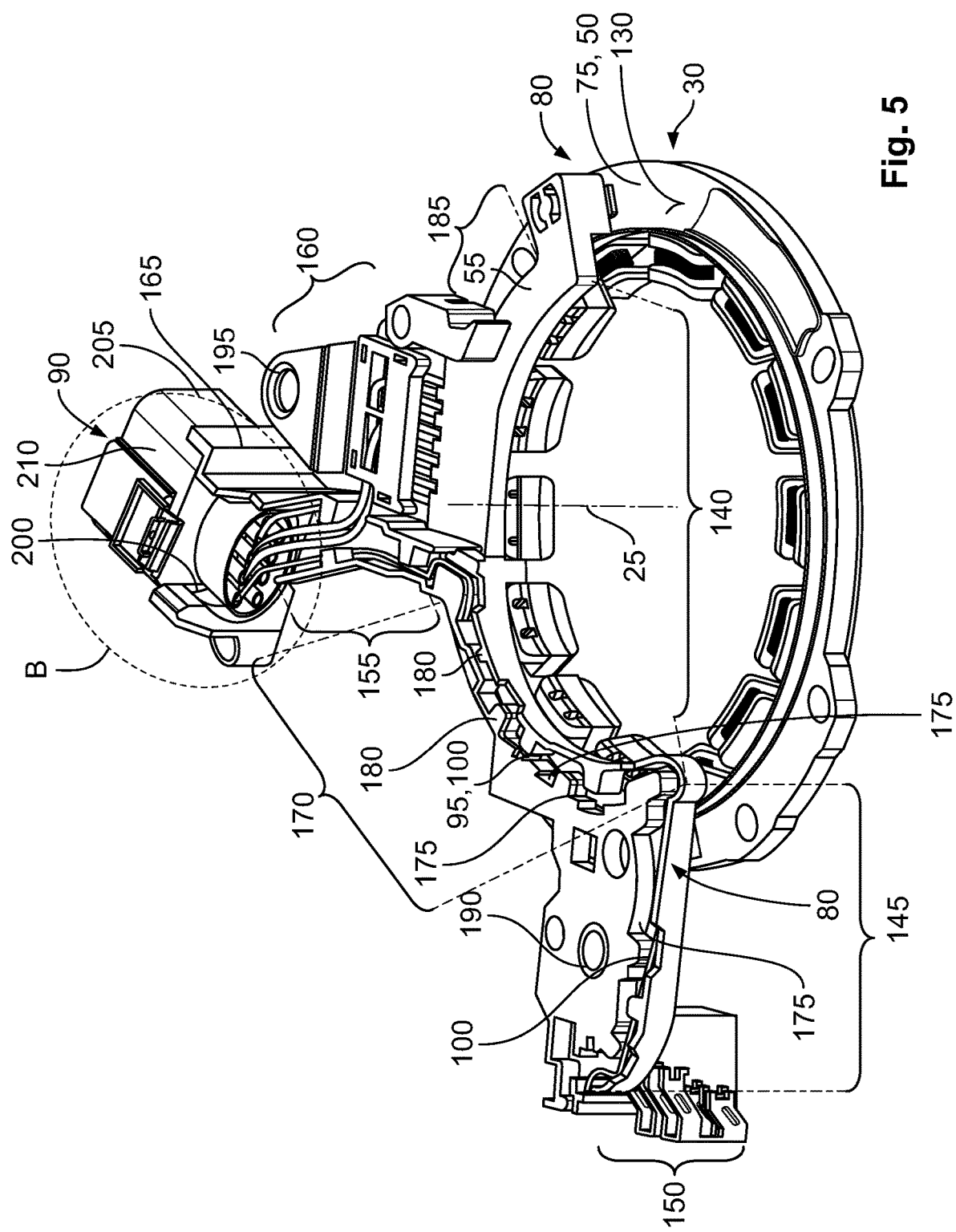
FIG. 5 is another perspective view of the measurement system.

FIG. 5 shows a perspective illustration of the measurement system 30 from another perspective. The carrier 55 comprises a first carrier section 140, a second carrier section 145, a holding section 150, a third carrier section 155, a first fastening section 160, and a holder 165.

The first carrier section 140 is of curved, for example arcuate configuration, in particular such that it runs on a circular path around the rotation axis 25, as shown in FIG. 5. The first carrier section 140 and the coil rim 75 are configured so as to run, by way of example, parallel in relation to one another. The carrier 55 is arranged above the first end side 130. In this case, the first carrier section 140 extends over an angular segment, for example of 120°. At one end in the circumferential direction, the first carrier section 140 is connected to the coil rim 75 in an interlocking manner by the first fastening device 80. The first carrier section 140 exhibits a substantially constant width in the radial direction, wherein, however, the first carrier section 140 can additionally extend radially to the outside for connection of the first fastening device 80. A minimum inside diameter of the first carrier section 140 corresponds substantially to a minimum inside diameter of the position sensor device 50.

In a first subregion 170 shown in FIG. 5, the first carrier section 140 is configured in the form of a cage and delimits a connection receptacle 175 in the first subregion 170. The first and the second electrical connection 95, 100 are arranged in the connection receptacle 175. In this case, the cage-like design in the first subregion 175 is selected in such a way that the electrical connection 95, 100, in particular when formed by a plurality of cables, can be inserted into the connection receptacle 170 without the first and the second electrical connection 95, 100 being able to leave the connection receptacle 170 again in the axial direction. To this end, webs 180, which are arranged offset, for example, at the top side alternately from radially on the inside to radially on the outside and from radially on the outside to radially on the inside in the circumferential direction and are of elastic configuration, reversibly close the connection receptacle 170.

In a second subregion 185 shown in FIG. 5, which is arranged offset in relation to the first subregion 175 in the circumferential direction, the first carrier section 140 is configured with a solid profile by way of example, wherein the first fastening device 80 is arranged on the first carrier section 140 on a side of the second subregion 185 that is opposite from the first subregion 175.

The second carrier section 145 is connected, radially on the inside, to the first carrier section 140, in particular to the first subregion 175, and adjoins an end of the first subregion 175 on a side of the first carrier section 140 that is opposite from the first fastening device 80. The second carrier section 145 is connected, radially on the outside, to the holding section 150. The connection receptacle 170 is continued in the second carrier section 145. In particular, the first electrical connection 95 is arranged in the connection receptacle 170 of the second carrier section 145. The first carrier section 140 and the second carrier section 145 are arranged perpendicular to the rotation axis 25 in a rotation plane. The second carrier section 145 is configured, by way of example, substantially in a plate-like manner.

As shown in FIG. 5, the holding section 150 adjoins a radially outer end of the second carrier section 145. The holding section 150 is configured, by way of example, so as to run parallel in relation to the rotation axis 25. In this case, the holding section 150 is arranged on a side that faces the coil rim 75 and therefore also on an axial side of the second carrier section 145 that faces the stator 15.

A first fastening receptacle 190 which is configured to receive the second fastening device 85 when the measurement system 30 is in a state in which it is mounted on the stator 15 is arranged in the second carrier section 145 between the holding section 150 and the first carrier section 140 in the radial direction. By way of example, the connection receptacle 170 is routed laterally past the first fastening receptacle 190 in the second carrier section 145, wherein the connection receptacle 170 is continued in the holding section 150. Furthermore, the first fastening device 80 can be arranged between the first fastening receptacle 190 and the first carrier section 140 in the radial direction.

The third carrier section 155 is arranged between the first subregion 175 and the second subregion 185 in the circumferential direction, as shown in FIG. 5. The third carrier section 155 is configured in a substantially web-like or plate-like manner and extends from radially on the inside to radially on the outside. In this case, the third carrier section 155 is arranged, together with the first carrier section 140, perpendicularly in relation to the rotation axis 25 in the rotation plane. The rotation plane, in which the first to the third carrier section 140, 145, 155 are arranged, runs parallel in relation to a further rotation plane in which the coil rim 75 is arranged. As a result, the measurement system 30 which is particularly compact in the radial direction is provided.

The third carrier section 155 is connected to the holder 165 radially on the outside. In this case, the fastening section 160 can be arranged on the side of the third carrier section 155, wherein the fastening section 160 is configured, by way of example, in an L shape and comprises a second fastening receptacle 195. The second fastening receptacle 195 is arranged perpendicular in relation to the rotation axis 25 in a different rotation plane to the first fastening receptacle 190. When the measurement system 30 is in the state in which it is mounted on the stator 15, the second fastening device 85 can also pass through the second fastening receptacle 195 in order to connect the measurement system 30 to the stator 15 in a reversibly releasable manner. The fastening section 160 is connected, by way of example, to the side of the third carrier section 155.

The holder 165 delimits a receptacle 200. In FIG. 5, the receptacle 200 is configured to be open at the top in the axial direction, so that the holder 165 substantially exhibits a U-shaped design. The receptacle 200 of the holder 165 is configured, by way of example, so as to correspond to an outer circumferential side 205 of the contact device 90, in particular a contact housing 210 of the contact device 90. In the mounted state, the contact housing 210 is arranged in the receptacle 200, wherein the holder 165 is advantageously pretensioned (in the circumferential direction) in order to prevent the contact housing 210 from being unintentionally released from the receptacle 205.

In order to remove the contact housing 210 from the receptacle 200, the holder 165 can be reversibly (in the circumferential direction) bent upward. In this case, by way of example, in FIG. 5 the contact housing 210 is pulled out of the receptacle 200 in a direction which is opposite from the coil rim 75 with a movement parallel in relation to the rotation axis 25. During mounting, the contact housing 210 is pushed into the receptacle 200 from above in an axial direction which is directed in the direction of the coil rim 75, wherein the holder 165 is widened during insertion.

Figure 6:
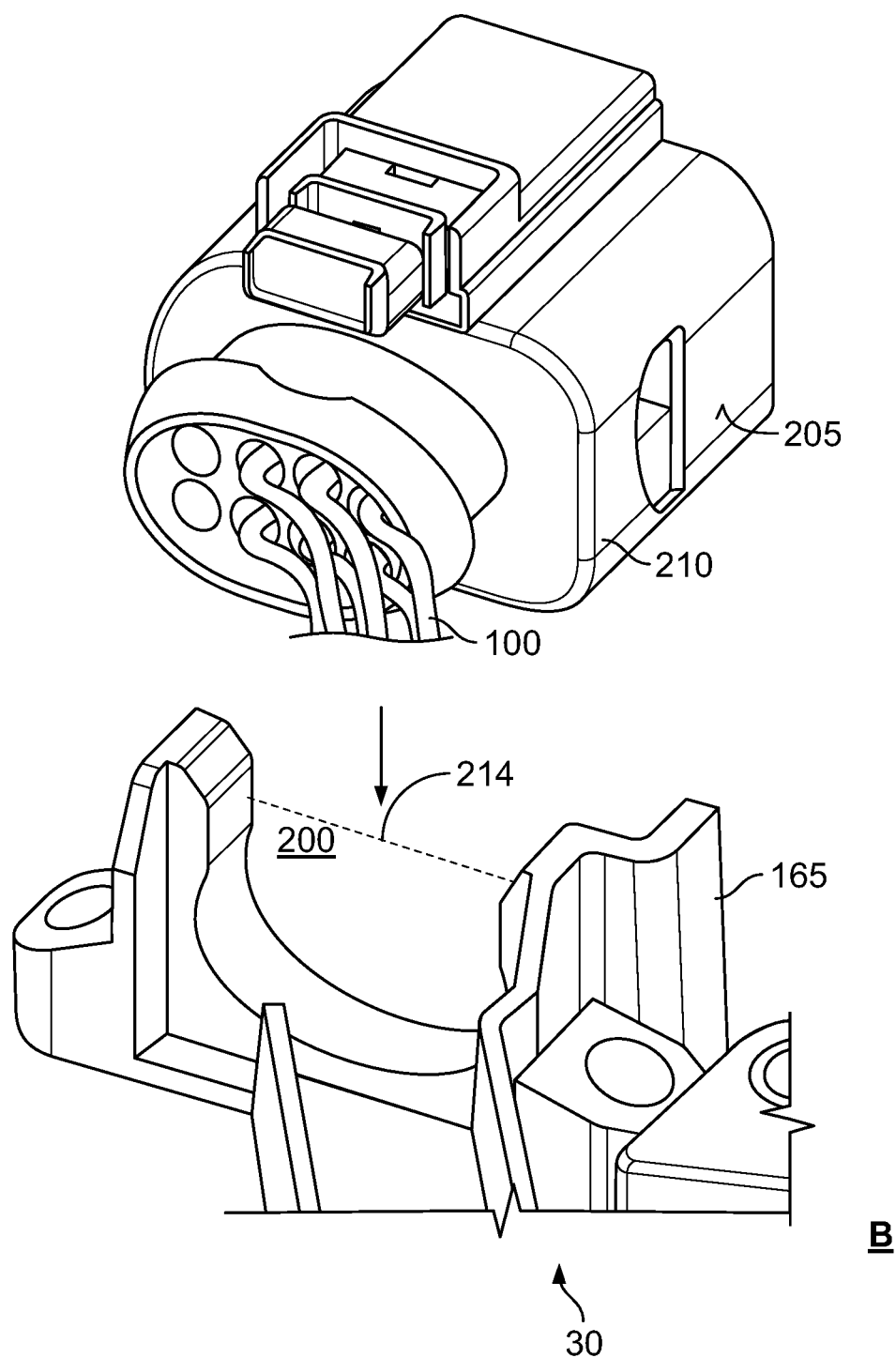
FIG. 6 is a perspective view of a detail B of the measurement system of FIG. 5 in a partially fitted state.

FIG. 6 shows a detail B, marked in FIG. 5, of the measurement system 30 in a partially mounted state. The receptacle 200 is configured in a tapered manner on a side that is opposite from the first carrier section 140, so that a receiving opening 214 is narrower than a maximum width of the receptacle 200. The outer circumferential side 205 of the contact housing 210 and a receiving contour of the receptacle 200 are advantageously configured so as to correspond to one another. In order to ensure that the contact housing 210 is held particularly securely in the receptacle 200, the holder 165 can be configured to be stepped at least on one side in the radial direction, so that the holder 165 bears against a particularly large surface area of the outer circumferential side 205 of the contact housing 210.

FIG. 7 shows a detail C, marked in FIG. 2, of the electrical machine 10 shown in FIG. 1. The measurement system 30 comprises a sensor holder 215. In FIG. 7, the sensor holder 215 is illustrated in accordance with a first embodiment and is arranged on the holding section 150, by way of example, radially on the outside with respect to the rotation axis 25. The sensor holder 215 delimits, together with the holding section 150, a sensor receptacle 220 (indicated using dashed lines in FIG. 7).

In the mounted state, as shown in FIG. 7, both the temperature sensor device 60 and also the stator element 45 are arranged in the sensor receptacle 220. In this case, the stator element 45 bears against the temperature sensor device 60 by way of a first side surface 225 that is opposite from the rotation axis 25. The sensor holder 215 can be displaced between a first position and a second position. In FIG. 7, the sensor holder 215 is illustrated in the second position in which the sensor holder 215 presses the stator element 45 and the temperature sensor device 60 against one another.

By way of example, in the first position, the sensor holder 215 is arranged in a manner offset axially downward and radially outward in relation to the second position in the embodiment, so that the sensor receptacle 220 is increased in size in this way. Therefore, the sensor holder 215 is unlocked in the first position and the stator element 45 can be inserted particularly easily into the said sensor holder 215 for receiving purposes. Similarly, the first position is suitable for mounting the temperature sensor device 60 on the holding section 150.

The sensor holder 215 comprises a substantially W-shaped and/or double-U-shaped design substantially in a plan view (from above parallel in relation to the rotation axis 25 in FIG. 7). In this case, the sensor holder 215 engages around the side of the holding section 150 and is therefore configured to be wider in the circumferential direction than the holding section 150.

In addition, a securing element 235 can be provided, wherein the securing element 235 additionally secures the sensor holder 215 in the second position and in this way ensures reliable pressing of the temperature sensor device 60 against the stator element 45. The securing element 235 is illustrated according to a first embodiment in FIG. 7.

Figure 8:
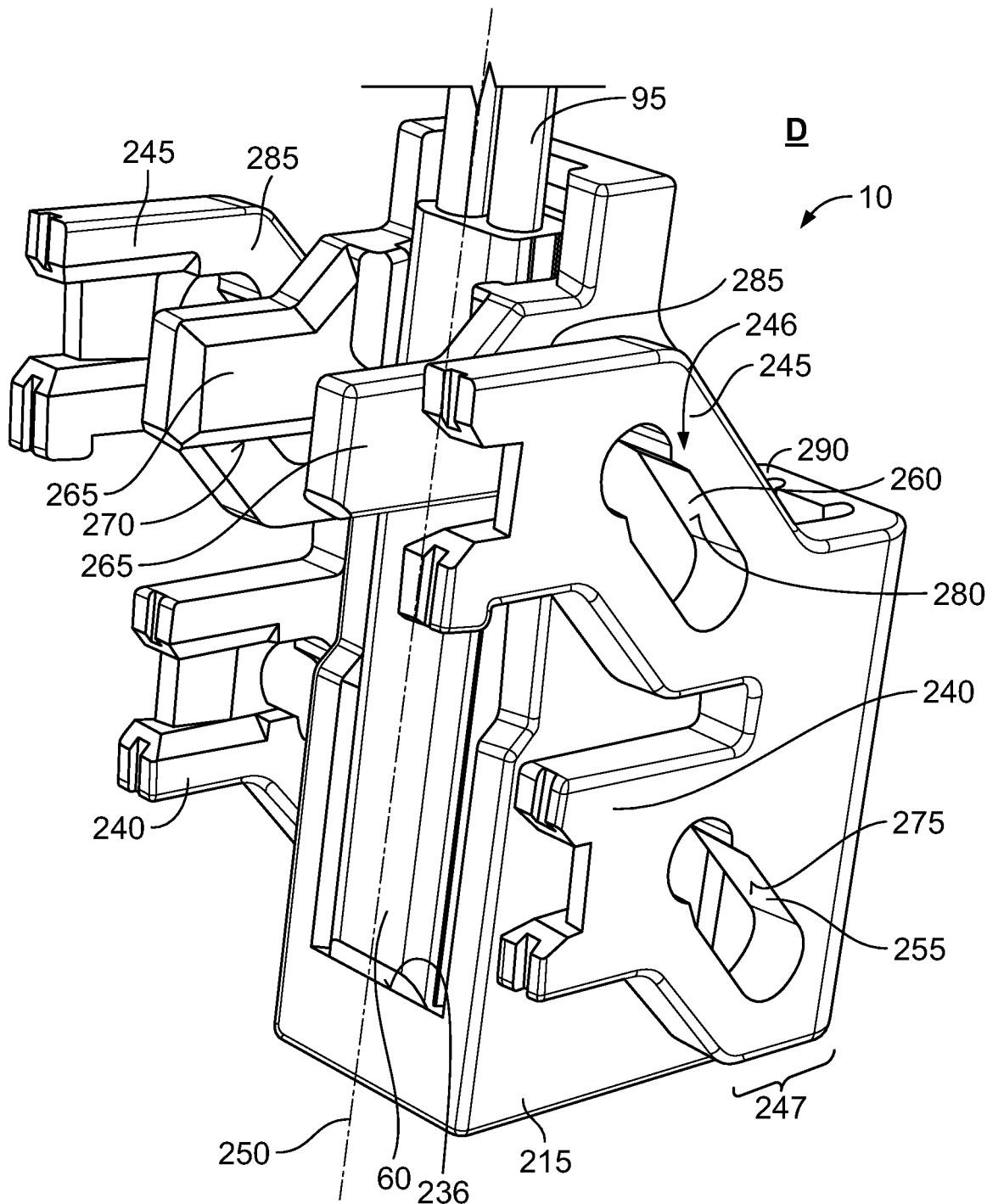
FIG. 8 is a perspective view of a detail D of measurement system of FIG. 7 in the partially fitted state.

FIG. 8 shows a perspective illustration of a detail D, marked in FIG. 7, of the electrical machine 10, wherein the holding section 150 is not illustrated in FIG. 8 for the purpose of improved illustration. The temperature sensor device 60 is configured so as to run substantially in a straight line parallel in relation to the rotation axis 25 and is connected at the top side to the first electrical connection 95. At the bottom side, the temperature sensor device 60 rests on a base 236 of the sensor holder 215.

By way of example, as shown in FIG. 8, the sensor holder 215 comprises in each case one first arm 240 (arranged on the bottom side in FIG. 7) and one second arm 245 on either side. By way of example, the arms 240, 245 are configured in a mirror-symmetrical manner with respect to a plane of symmetry 250 which is arranged in the center of the sensor holder 215. In the text which follows only one first arm 240 and one second arm 245 will be explained in each case, wherein the explanation given below is also intended to apply to the other first and second arm 240, 245 (which are respectively arranged opposite). The plane of symmetry 250 is likewise arranged in a central position between the two first arms 240 and the two second arms 245. The first arm 240 and the second arm 245 are arranged in a common plane. The first arm 240 and the second arm 245 can be configured in an integrated manner in a partial arm section 247. The arms 240, 245 are arranged so as to run in the radial direction (in the form of a secant). The sensor holder 215 is connected in a movable manner to the holding section 150 by a slotted guide 246. To this end, an obliquely running first cutout 255 is arranged in the first arm 240 and an obliquely running second cutout 260 is arranged in the second arm 245, wherein the first cutout 255 and the second cutout 260 are configured so as to run parallel in relation to one another. Owing to the arrangement of the cutouts 255, 260 in a respective arm 240, 245, each of the arms 240, 245 comprises a stepped design by way of example. The first cutout 255 and the second cutout 260 can be configured in the form of an elongate hole, wherein, however, a constriction can be provided adjacent to a top end. The two arms 240, 245 can also be connected to one another.

As shown in FIG. 8, the first cutout 255 comprises a first sliding surface 275 and the second cutout 260 comprises a second sliding surface 280, wherein the first sliding surface 275 and the second sliding surface 280 are configured in a planar manner and run in an obliquely inclined manner in relation to the rotation axis 25.

Between the two second arms 245 which are arranged on the top side in relation to the first arm 240, the sensor holder 215 comprises an operating web 265 which is arranged on either side of the sensor receptacle 220. Instead of the double design of the operating web 265 shown in FIGS. 7 and 8, it is also conceivable for only one operating web 265 to be provided. The operating web 265 comprises, at the bottom side on a side that faces the stator 15, an operating surface 270, wherein the operating surface 270 is configured in a planar manner and extends in a rotation plane in relation to the rotation axis 25. In the assembled state of the electrical machine 10, the stator element 45 bears against the operating surface 270 on the bottom side.

Between the operating web 265 and the arms 240, 245, the sensor holder 215 delimits on either side a respective receiving section 285 into each of which a limb of the holding section 150 engages in the mounted state. Each receiving section 285 is configured in the form of a slot.

Both the first arm 240 and also the second arm 245 and the operating web 265 are arranged on a common radial side. The first and the second arm 240, 245 and the operating web 265 are connected to one another via a further holding section 290 on the rear side (radially on the outside). In the embodiment, the sensor holder 215 is manufactured in one piece and from the same material from a plastic. The sensor holder 215 can be produced, for example, using an injection-molding process.

Figure 9:
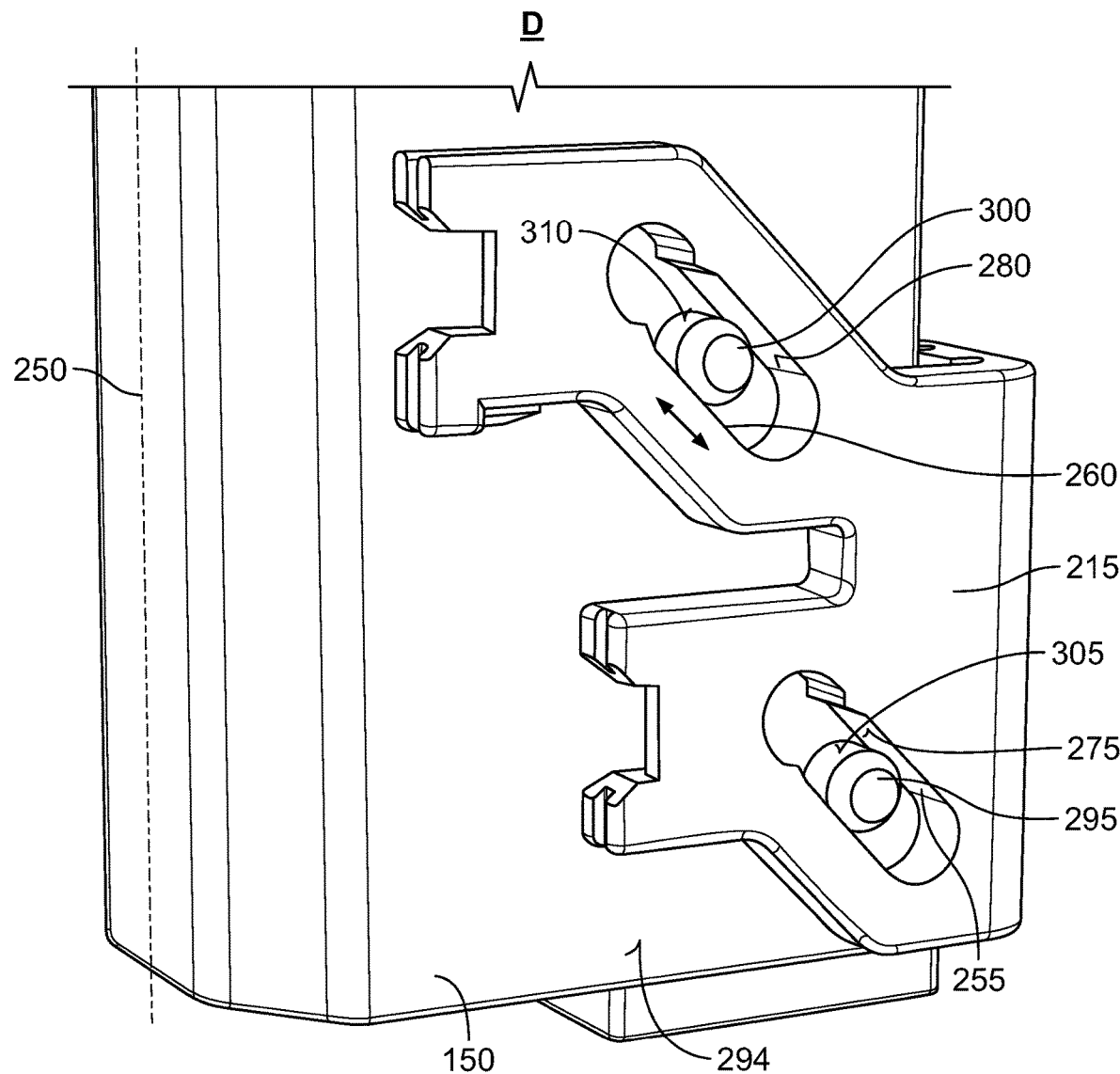
FIG. 9 is another perspective view of the detail D of the measurement system of FIG. 7 in the partially fitted state.

FIG. 9 shows the detail D, marked in FIG. 7, of the electrical machine 10 in the partially assembled state, wherein illustration of the securing element 235 has been dispensed with in FIG. 9.

As shown in FIG. 9, the slotted guide 246 comprises at least one pair of engagement elements 295, 300, which are configured in the form of pins, on either side of a second side surface 294 of the holding section. In the embodiment, the engagement elements 295, 300 are, by way of example, configured in an identical manner and exhibit a cylindrical design. In the mounted state, a first engagement element 295 engages into the first cutout 255. On the circumferential side, the first engagement element 295 comprises a third sliding surface 305. The first engagement element 295, by way of the third sliding surface 305, bears against the first sliding surface 275.

The second engagement element 300 engages into the second cutout 260. In the embodiment, the first engagement element 295 and the second engagement element 300 are, by way of example, configured in an identical manner in relation to one another, wherein, however, the second engagement element 300 is arranged in a manner offset upwards in the axial direction in FIG. 9. Furthermore, the second engagement element 300 is arranged radially to the inside in relation to the first engagement element 295. The second engagement element 300 comprises, on the circumferential side, a fourth sliding surface 310 which is configured, by way of example, in a cylindrical manner in the embodiment. The second engagement element 300, by way of the fourth sliding surface 300, bears against the second sliding surface 280.

The slotted guide 246 guides the sensor holder 215 as it is displaced between the first position and the second position. In this case, the sensor holder 215 is arranged radially on the outside in the first position, so that the first engagement element 295 is situated at the top in the first cutout 255. Similarly, the second engagement element 300 is situated at the top in the second cutout 260 in the first position. If the sensor holder 215 is moved to the second position (an intermediate position is illustrated in FIG. 9), the sensor holder 215 moves radially to the inside and axially to the top. In the second position, the second engagement element 300 is then arranged at a bottom end of the second cutout 260 and the first engagement element 295 is arranged at a bottom end of the first cutout 255.

FIG. 9 illustrates only the one side of the holding section 150 and of the sensor holder 215. At the rear side, the holding section 150 is also configured in a mirror-symmetrical manner in relation to that side which faces the viewer, by way of example in an identical manner, preferably with mirror-symmetry in relation to the plane of symmetry 250. Therefore, the sensor holder 215 is fastened to the holding section 150 via four engagement elements 295, 300. This design ensures reliable movement of the sensor holder 215 on the holding section 150 and prevents tilting or wedging.

Figure 10:
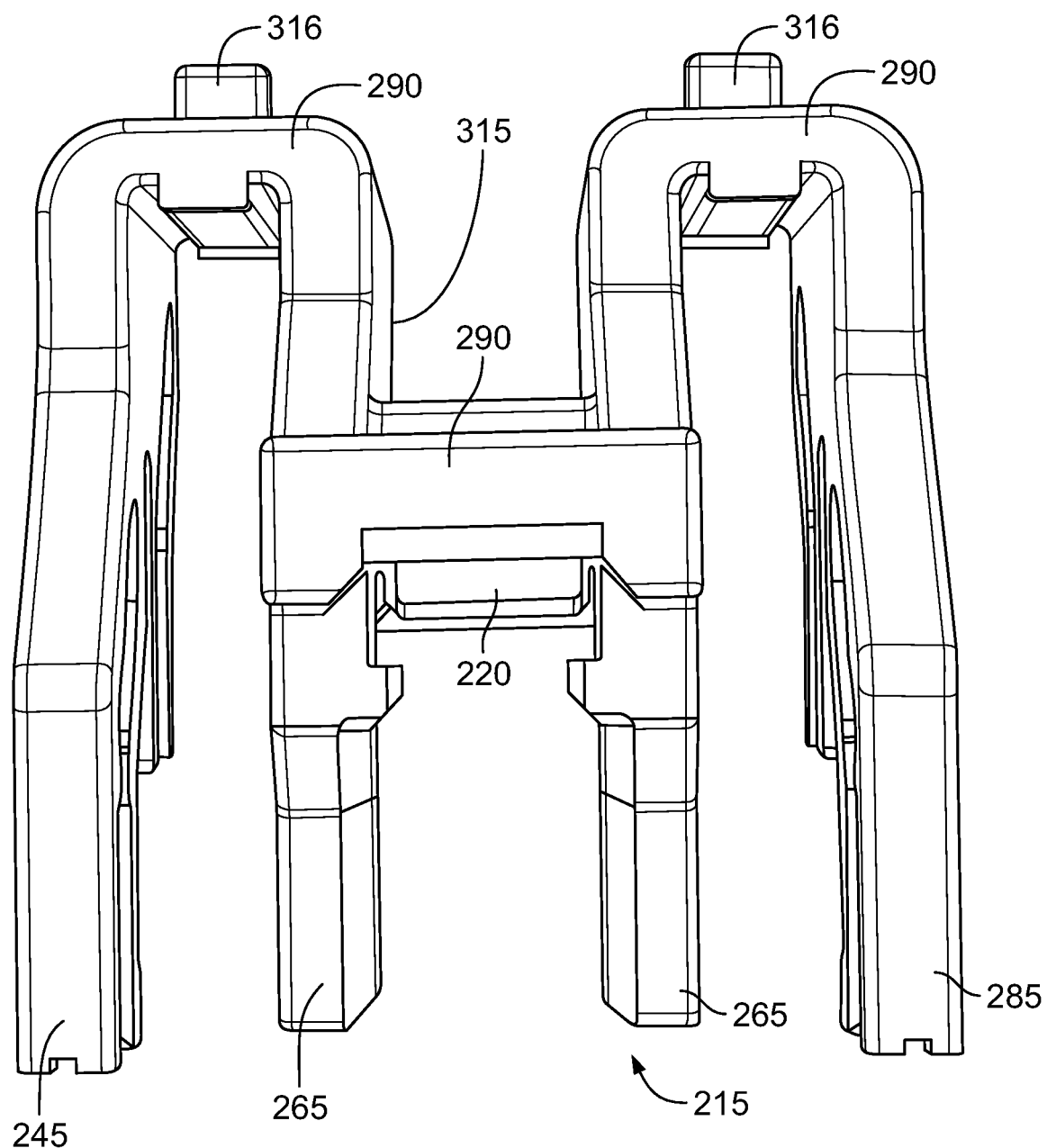
FIG. 10 is a plan view of a sensor holder.

FIG. 10 shows a plan view of the sensor holder 215. The further holding section 290 can be configured in a stepped manner. The further holding section 290 can also be configured in a plate-like manner. In the embodiment, the further holding section 290 is selected in such a way that the further holding section 290 delimits a third cutout 315 which is configured in a slot-like manner and is arranged radially on the outside. On a side that is opposite from the sensor receptacle 220, the sensor holder 215 can comprise at least one projection 316 on the further holding section 290, which projection extends into a side that is opposite from the sensor receptacle 220 and exhibits, by way of example, substantially a square or rectangular cross section.

Figure 11:
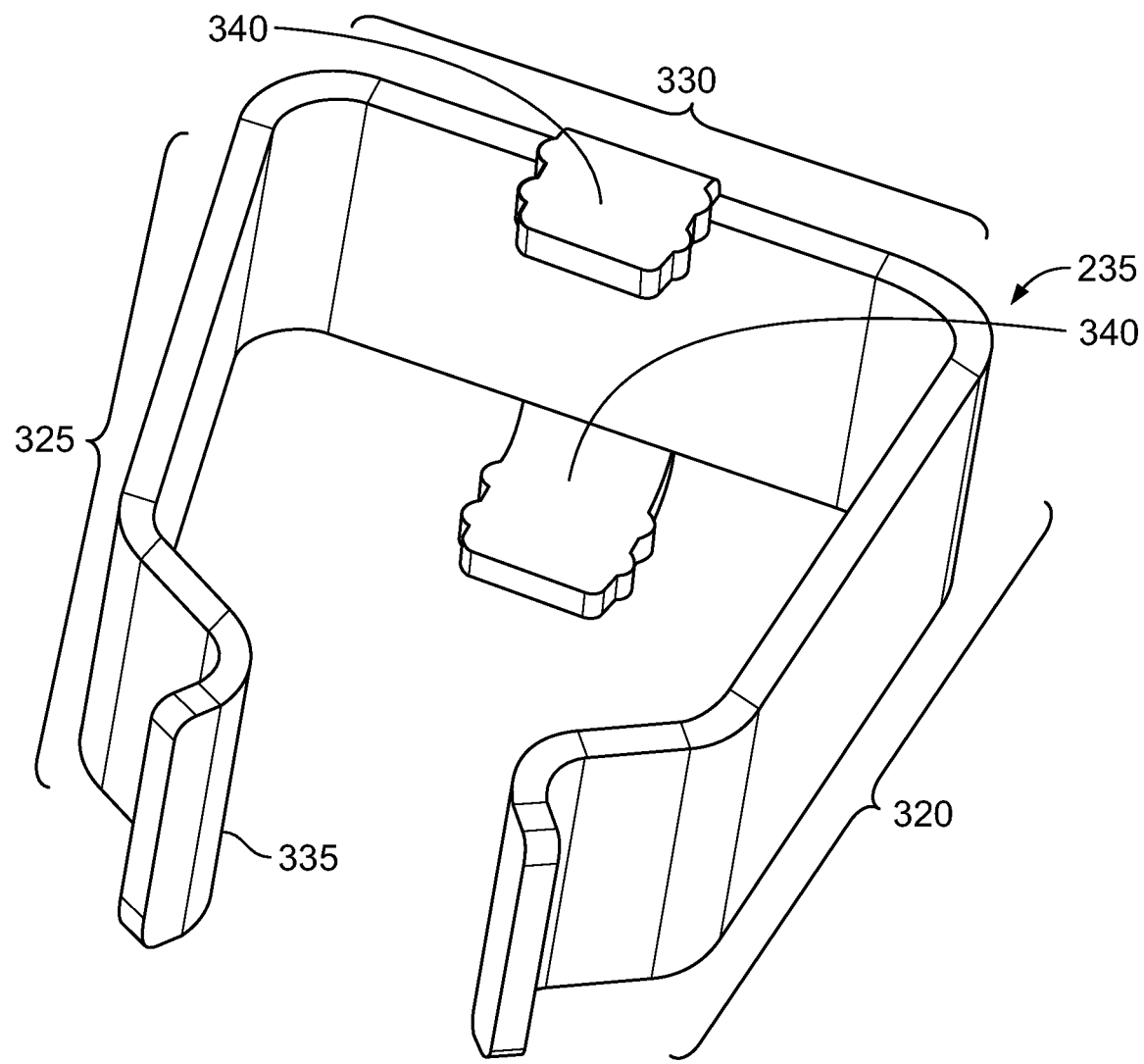
FIG. 11 is a perspective view of a securing element.

FIG. 11 shows a perspective illustration of the securing element 235. The securing element 235 is configured in a substantially U- or horseshoe-shaped manner. In the embodiment, the securing element 235 comprises a first securing section 320, a second securing section 325 and a second fastening section 330. In the embodiment, the second fastening section 330 is configured, by way of example, in a plate-like manner. On either side, the first securing section 320 and the second securing section 325 are fastened to the second fastening section 330 opposite one another. The first securing section and the second securing section 320, 325 extend in the same direction and run obliquely towards one another as the distance from the second fastening section 330 increases. The first securing section 320, the second securing section 325 and the second fastening section 330 substantially exhibit a clip-like design. On a side that is opposite from the second fastening section 330, the first securing section 320 and the second securing section 325 delimit an insertion opening 335 which is of narrower configuration than the fastening section 330.

As shown in FIG. 11, a latching section 340 can be arranged at the top side and the bottom side of the fastening section 330, wherein the latching section 340 is configured in a plate-like manner and extends in the direction of the insertion opening 335. The latching section 340 is, by way of example, of narrower configuration than the fastening section 330 in FIG. 10.

Figure 12:
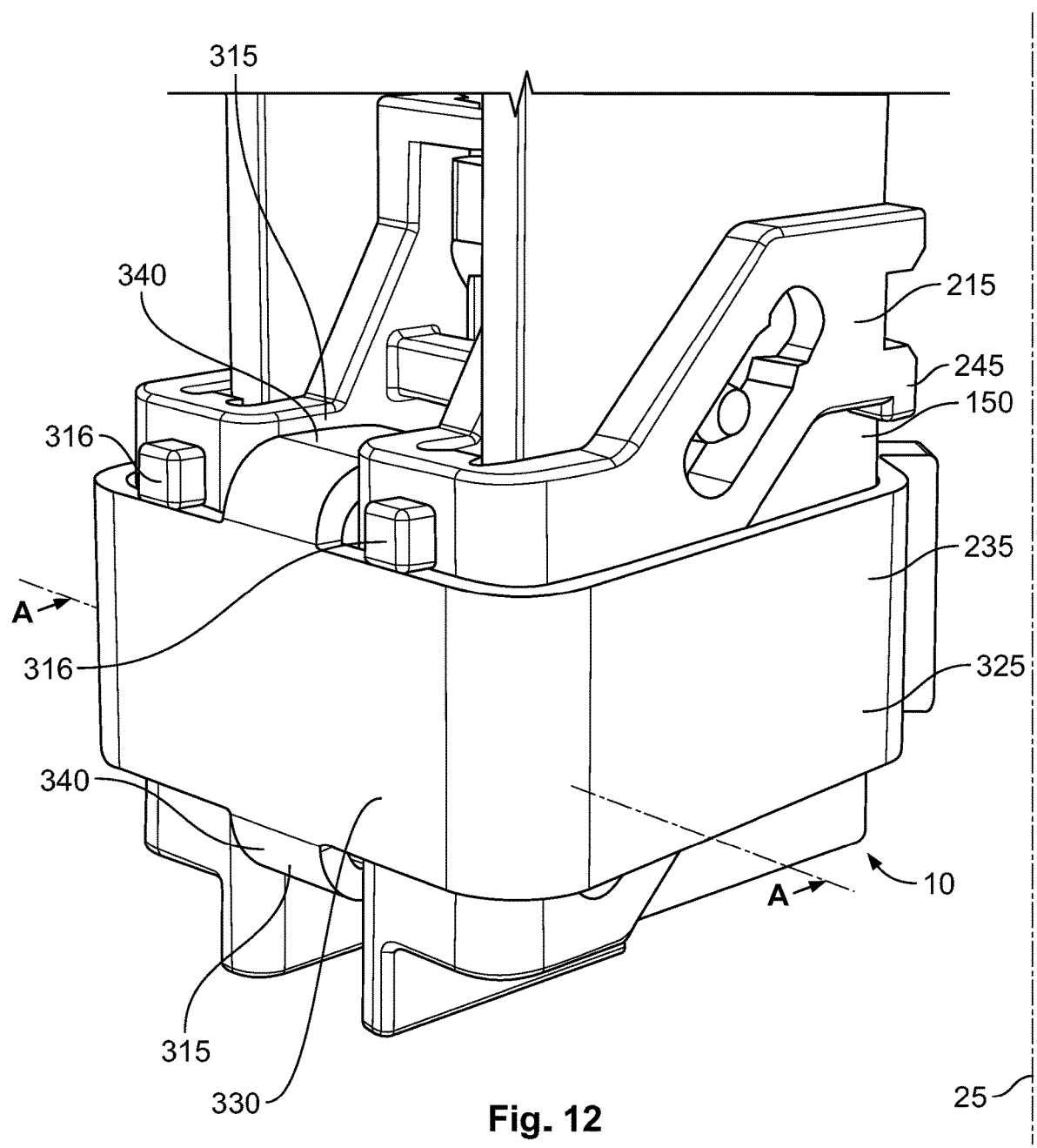
FIG. 12 is a perspective view of the electrical machine in an assembled state.

FIG. 12 shows a detail of a perspective illustration of the electrical machine 10 in the assembled state. In this case, the sensor holder 215 is in the second position. Furthermore, the securing element 235 is mounted on the sensor holder 215 and on the holding section 150. By way of example, the securing element 235 is pushed onto the sensor holder 215 and the holding section 150 in the radial direction via the insertion opening 335. The first securing section 320 and the second securing section 325 are arranged laterally on the outside of the first and the second arm 240, 245 on either side and are guided laterally past the first and the second arm 240, 245. The first and the second securing section 320, 325 engage behind the holding section 150 at the rear side (for example radially on the inside) on the side that is opposite from the fastening section 330.

In the mounted state, the securing element 235 is configured in a spring-like manner and is tensioned in the mounted state. As a result, the securing sections 320, 325 which run towards one another at the insertion opening 335 push the fastening section 330 in the direction of the sensor holder 215, so that the said sensor holder 215 is reliably secured in the second position and therefore pressing of the temperature sensor device 60 against the stator element 45 is ensured. As a result, the sensor holder 215 is reliably prevented from being released in the event of the electrical machine 10 vibrating.

The securing element 235 is securely positioned on the sensor holder 215 in the circumferential direction by way of the latching section 340, which is arranged on the top side and the bottom side of the fastening section 330, engaging into the third cutout 315 and therefore orienting the securing element 235 with a defined orientation. Shifting in the upward direction is prevented by way of the fastening section 330 being stopped against the projection(s) 316 at the top side, as shown in FIG. 12.

Figure 13:
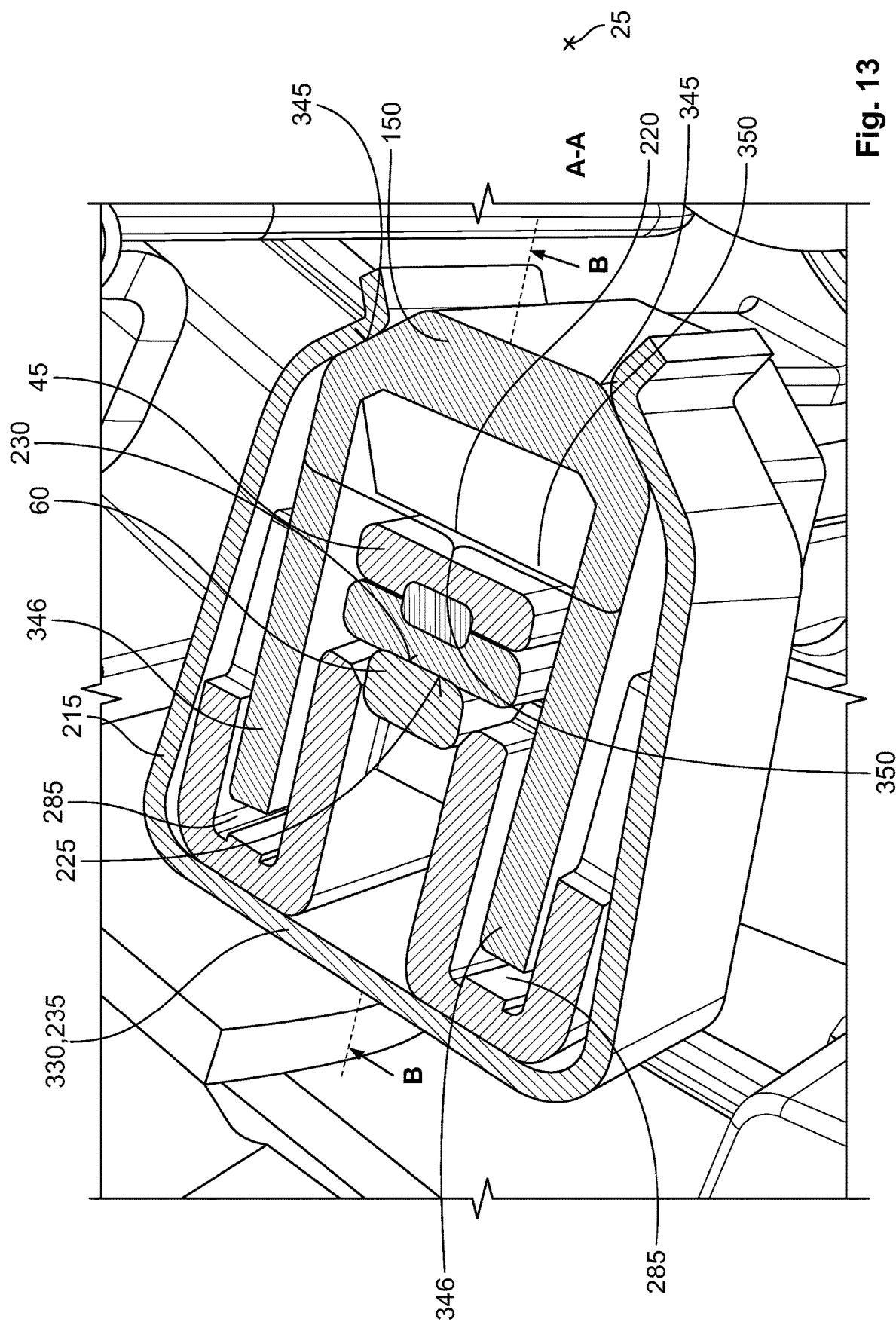
FIG. 13 is a sectional perspective view of the electrical machine, taken along plane A-A of FIG. 12.

FIG. 13 shows a sectional view along a sectional plane A-A, shown in FIG. 12, through the electrical machine 10. The holding section 150 substantially exhibits a U-shaped design, wherein, in the embodiment, the holding section 150 is oriented, by way of example, in such a way that the holding section is open radially, by way of example, to the outside and the sensor holder 215 is fastened to the holding section 150 radially from the outside with respect to the rotation axis 25. Therefore, the sensor holder 215 is, by way of example, fastened to the holding section 150 radially on the outside. As an alternative, it would also be possible for the holding section 150 to be oriented in relation to the rotation axis 25 in such a way that it is open radially to the inside and the sensor holder 215 is fastened radially to the inside of the holding section 150. In this case, the fastening section 330 of the securing element 235 is likewise arranged radially on the inside in relation to the sensor holder 215 and in relation to the holding section 150. A limb 346 engages into the receiving section 285 in each case. As a result, the sensor receptacle 220 is closed at the side.

The holding section 150 can comprise a bevel 345 on a side that is opposite from the sensor holder 215 (by way of example the side of the holding section 150 that is arranged radially on the inside in FIG. 13), wherein, by way of example, the bevel 345 is arranged on either side of a transverse section 350 of the holding section 150. The transverse section 350 runs, by way of example, tangentially in relation to a circular path around the rotation axis 25 and is, by way of example, oriented perpendicularly in relation to the limb 346. The transverse section 350 delimits the sensor receptacle 220 radially on the inside in the radial direction. The bevel 345 serves for pushing of the fastening section 330 additionally in the direction of the transverse section 350 by the tensioned securing element 235.

The temperature sensor device 60 comprises a third side surface 230, as shown in FIG. 13. It is particularly advantageous here when the first side surface 225 and a third side surface 225, 230 are configured in a corresponding, for example a planar, manner, so that it is ensured that the temperature sensor device 60 bears flat against the stator element 45 and therefore good thermal contact between the temperature sensor device 60 and the stator element 45 is ensured. As a result, the temperature sensor device 60 can ascertain, in particular measure, the temperature of the stator element 45 in a particularly accurate manner.

Figure 14:
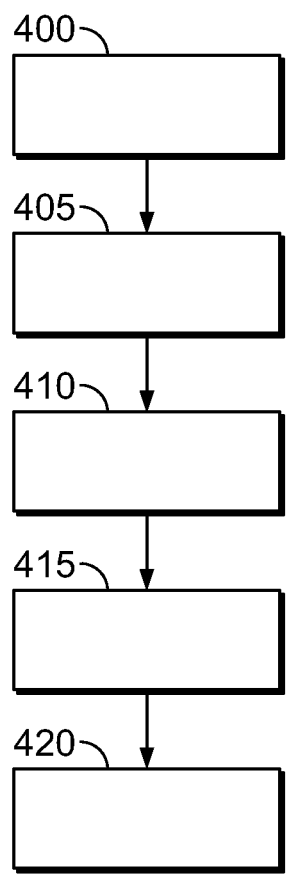
FIG. 14 is a flowchart of a method for producing the electrical machine of FIGS. 1 to 12 during a first method step.

FIG. 14 shows a flowchart of a method for producing the electrical machine 10 shown in FIGS. 1 to 13.

In a first method step 400, the measurement system 30 shown in FIGS. 1 to 13 and at least the stator 15 are in an embodiment provided together with the rotor 20. The stator 15 and the rotor 20 can be preassembled, that is to say that the stator 15 engages around the rotor 20 and the rotor 20 is mounted such that it can rotate about the rotation axis 25. The measurement system 30 is provided, by way of example, as a separate component, wherein no further cable for connecting the contact device 90, for example, to the controller is connected to the contact device 90 for simplified handling. This ensures good handling of the measurement system 30 during assembly of the electrical machine 10.

Figure 15:
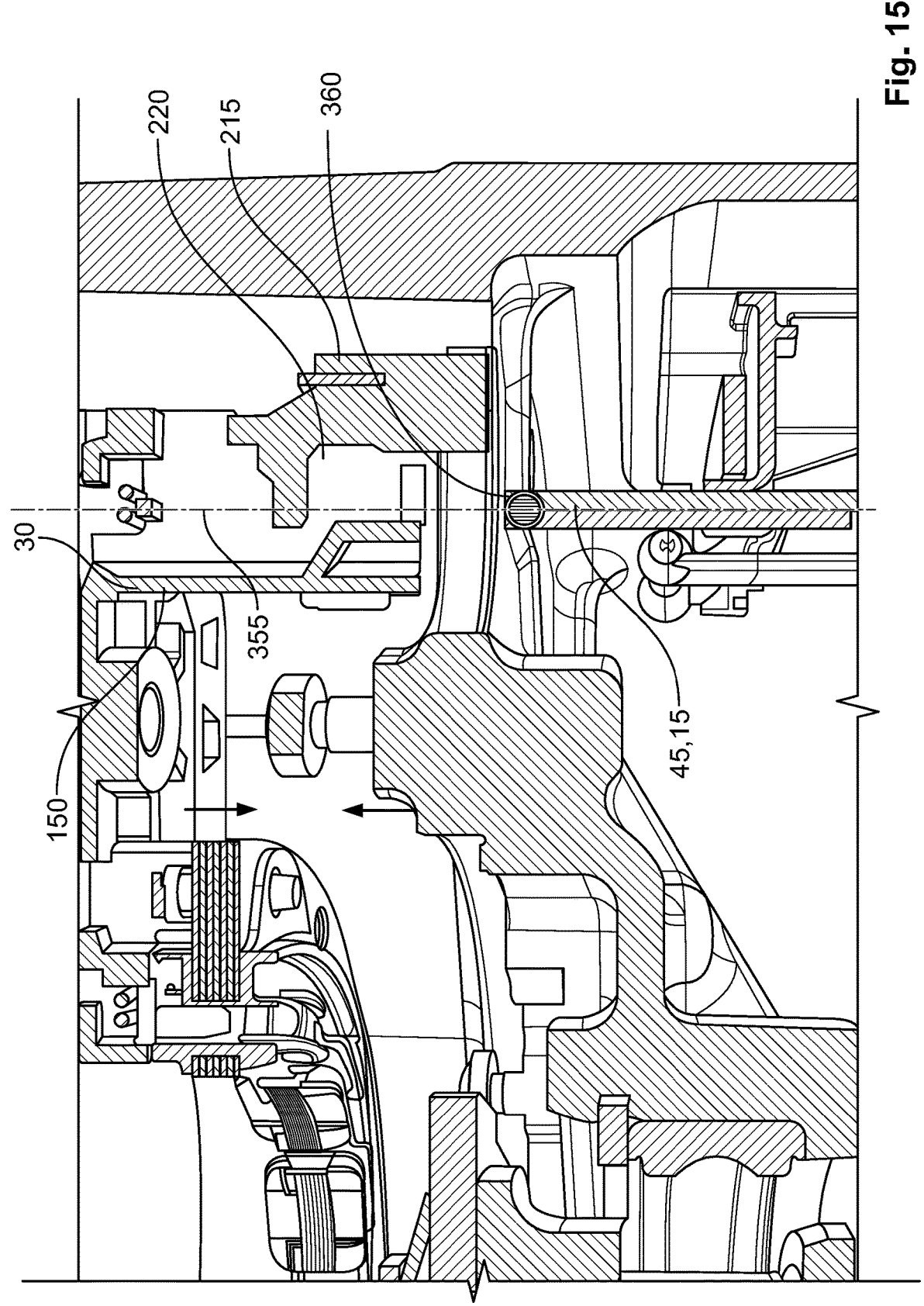
FIG. 15 is a sectional perspective view of the electrical machine along plane B-B of FIG. 13 during a second method step.

FIG. 15 shows a sectional view along a sectional plane B-B, shown in FIG. 13, during a second method step 405. FIG. 15 shows a sectional view along the sectional plane B-B, shown in FIG. 13, through the electrical machine 10 during a third method step 410, and FIG. 16 shows a sectional view along the sectional plane B-B, shown in FIG. 13, through the electrical machine 10 after a fourth method step 415.

In the second method step 405, shown in FIG. 15, the measurement system 30 is positioned in a centered manner in relation to the rotation axis 25 and is oriented in such a way that the sensor receptacle 220 is arranged in alignment above the stator element 45. For mounting purposes, the measurement system 30 and the stator 15 are moved towards one another along a mounting axis 355. The mounting axis 355 is oriented parallel in relation to the rotation axis 25. For example, the stator element 45 can be arranged so as to run along the mounting axis 355. The movement towards one another can take place, for example, by way of the stator 15 being held stationary and the measurement system 30 being moved towards the stator 15, for example, from above downwards along the mounting axis 355 and the rotation axis 25. In this case, the stator element 45 points, by way of a tip 360, directly towards the sensor receptacle 220. It is self-evident that it is also conceivable for the stator 15 to be moved towards the measurement system 30, wherein, for example, the measurement system 30 is held stationary. The measurement system 30 and the stator 15 can also be moved towards one another at the same time.

During mounting of the measurement system 30 during the second method step 405, the sensor holder 215 is in the first position.

Figure 16:
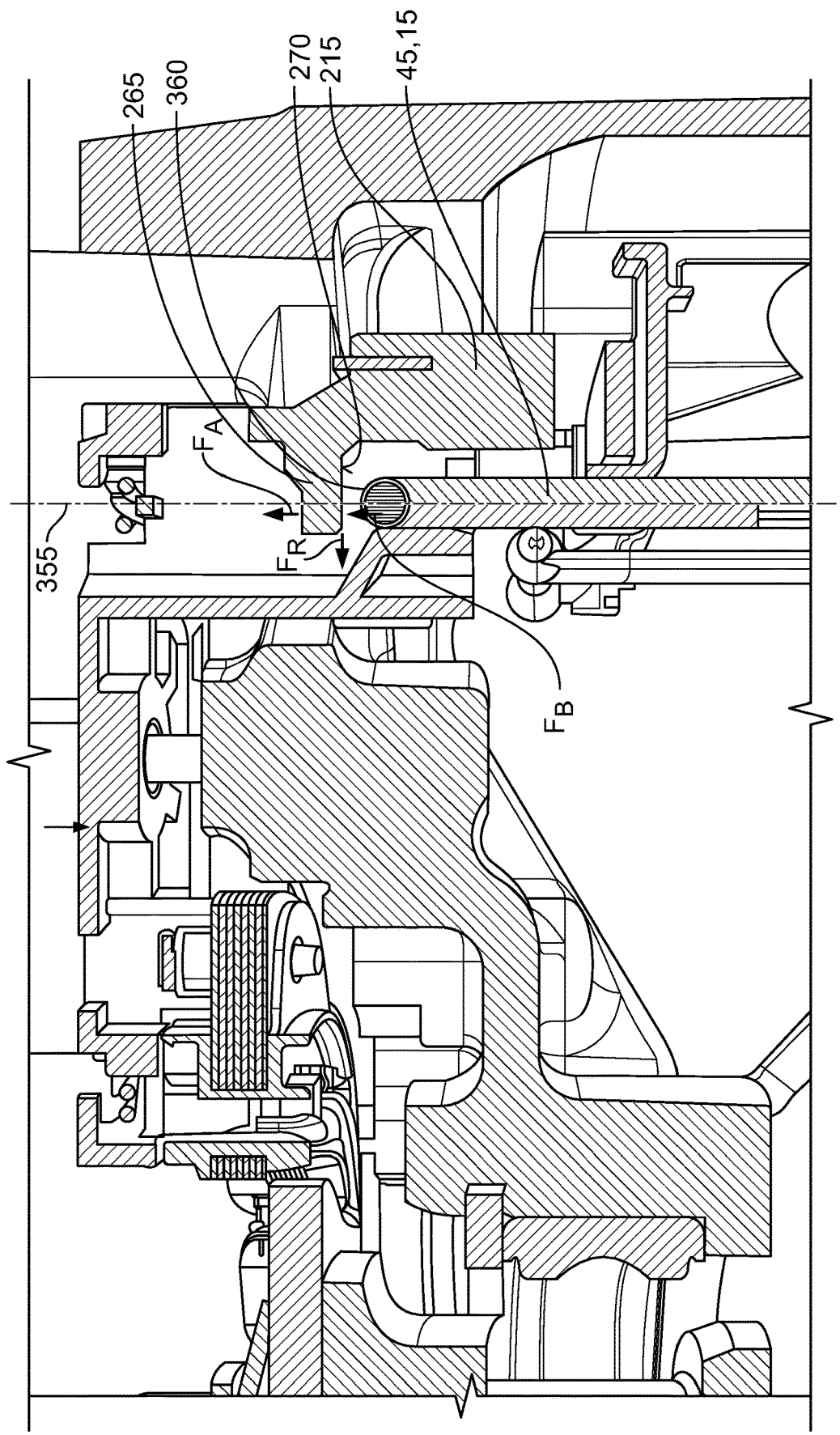
FIG. 16 is a sectional perspective view of the electrical machine along plane B-B of FIG. 13 during a third method step.

In the third method step 410, as shown in FIG. 16, the stator element 45, by way of the end side, comes into contact with the operating surface 270. For example, the stator element 45 then bears, by way of the tip 360, against the operating web 265 at the bottom side, as shown in FIG. 16. If, for example, the measurement system 30 is fitted onto the stator 15 from top to bottom along the mounting axis 355, an operating force FB is introduced into the operating web 265 via the operating surface 270 by the stator element 45. Owing to the oblique orientation of the first and the second sliding surface 275, 280, the operating force FB is converted into an axial force FA and a radial force FR depending on the orientation of the first and the second sliding surface 275, 280 in relation to the mounting axis 355 along which the operating force FB acts. As a result, the operating force is low, and therefore the measurement system 30 can be mounted in a particularly simple manner.

As shown in FIG. 16, the axial force FA acts along the mounting axis 355 and therefore parallel in relation to the rotation axis 25, whereas conversely the radial force FR acts perpendicularly in a plane in relation to the mounting axis 355 or the rotation axis 25. In the embodiment, the radial force FR acts radially towards the inside from the mounting axis 355 in the direction of the rotation axis 25. During the third method step 410, the axial force FA causes the sensor holder 215 to be pushed upwards in the axial direction out of the first position in the direction of the second position. At the same time, the sensor holder 215 moves radially towards the inside in the direction of the rotation axis 25 owing to the radial force FR. In the process, the sensor holder 215 with the temperature sensor device 60 moves in the direction of the stator element 45. Furthermore, the first fastening device 80 is pushed into the fastening opening 110 by way of the axial force FA.

The mounting movement along the mounting axis 355 is maintained until the sensor holder 215 is in the second position. In this case, as explained above, the temperature sensor device 60 then bears against the side of the stator element 45. Furthermore, the carrier 55 bears, at the end side, against the stator rim 75 and the first fastening device 80 fastens the carrier 55 to the stator rim 75.

Figure 17:
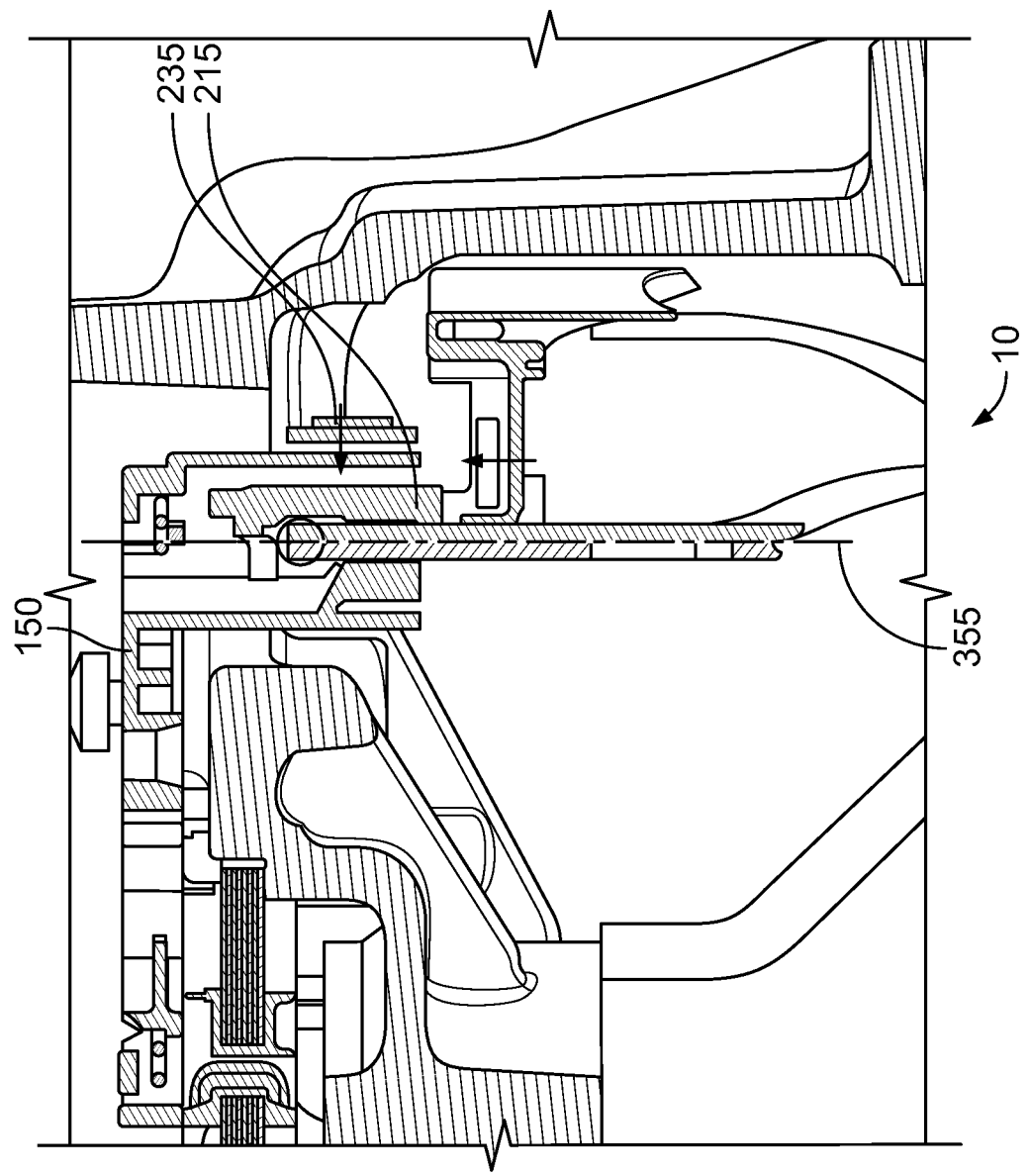
FIG. 17 is sectional perspective view of the electrical machine along plane B-B of FIG. 13 after a fourth method step.

In the fourth method step 415, shown in FIG. 17, the securing element 235 is pushed onto the sensor holder 215 and the holding section 150 from the side, for example in the embodiment from radially on the outside to radially on the inside. The pushing-on movement can take place in the radial direction, by way of the securing sections 320, 325 being bent upwards for example. It is also conceivable for the securing element 235 to be pushed from below upwards onto the holding section 150 and the sensor holder 215 along the mounting axis 355 in the axial direction.

In the fifth method step 420, the measurement system 30 is connected in a reversibly releasable manner to the stator 15 by the second fastening device 85. Furthermore, the electrical machine 10 is fully assembled.

The above design of the electrical machine 10 and of the measurement system 30 has the advantage that the number of mounting steps is particularly low owing to the integration of the temperature sensor device 60 and the position sensor device 50 into the measurement system 30. Furthermore, reliable positioning of the temperature sensor device 60 on the stator element 45 can be ensured, the said positioning being resistant to vibration. Furthermore, undesired release of the temperature sensor device 60 from the stator element 45 is reliably avoided. Furthermore, it is advantageous for the measurement system 30 to be able to be mounted together with the stator 15 and the rotor 20 in a substantially automated manner. As a result, the electrical machine 10 can be produced in a particularly cost-effective manner overall.

Furthermore, play compensation is provided by the slotted guide 246 between the sensor holder 215 and the holding section 150, the said play compensation serving to compensate for play in the thickness of the stator element 45 and/or of the temperature sensor device 60.

Furthermore, good thermal contact between the temperature sensor device 60 and the stator element 45 and, respectively, good thermal coupling between the temperature sensor device 60 and the winding is provided by the direct arrangement of the temperature sensor device 60 on the stator element 45, so that it is ensured that the temperature is ascertained in an effective and accurate manner by means of the temperature sensor device 60.

The measurement system 30 can be mounted on the electrical machine 10 particularly quickly and easily. Furthermore, the measurement system 30 can be premounted in an automated manner, so that only a few components have to be added during the final assembly of the electrical machine 10. In addition, if the measurement system 30 is damaged, it can be replaced in a particularly simple and cost-effective manner.

Figure 18:
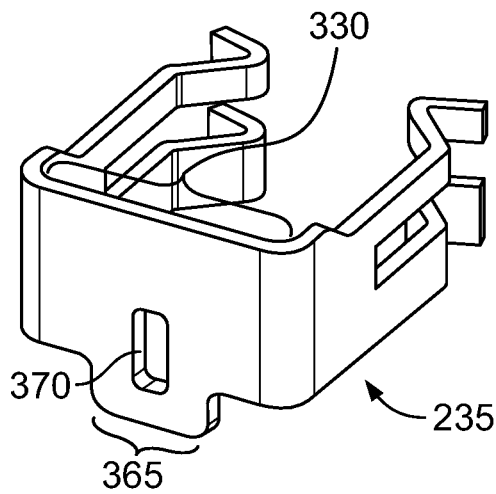
FIG. 18 is a perspective view of a securing element according to a second embodiment.

FIG. 18 shows a perspective illustration of the securing element 235 according to a second embodiment. The securing element 235 is configured in a substantially identical manner to the securing element 235 described in FIGS. 1 to 17. Only the differences between the securing element 235 shown in FIG. 18 and the securing element 235 shown in FIGS. 1 to 17 will be discussed in the text which follows.

In the embodiment shown in FIG. 18, the latching section 340 is dispensed with. By way of example, the fastening section 330 is extended in a third subregion 365 at the bottom side in FIG. 18. In the fastening section 330, the securing element 235 comprises a fourth cutout 370 which is configured, by way of example, in the form of an elongate hole. The fourth cutout 370 is oriented so as to run, by way of example, parallel in relation to the rotation axis 25.

Figure 19:
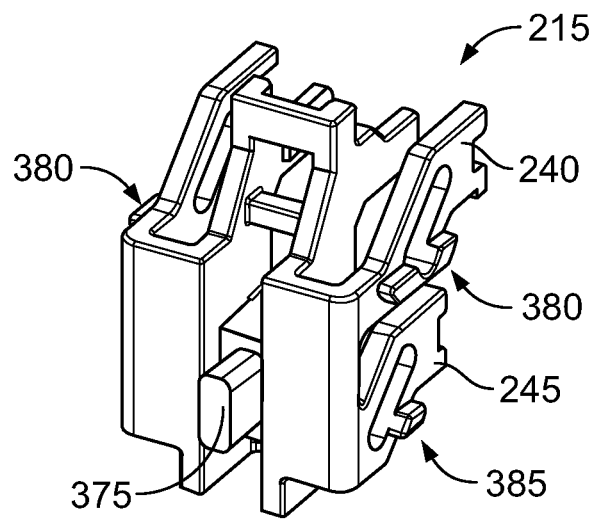
FIG. 19 is a perspective view of a sensor holder according to a second embodiment.

FIG. 19 shows a perspective illustration of a sensor holder 215 according to a second embodiment. In comparison with the sensor holder 215 shown in FIGS. 1 to 17, the sensor holder 215 additionally comprises a rib 375 which extends in the radial direction. The rib 375 and the fourth cutout 370 are configured so as to correspond to one another at least at the circumferential side.

In addition, a second latching lug 380 is respectively arranged on the outside of the first arm 240 and a third latching lug 385 is respectively arranged on the outside of the second arm 245, as shown in FIG. 19. The second and the third latching lug 380, 385 are oriented parallel in relation to one another and tangentially with respect to the rotation axis 25. The second and the third latching lug 380, 385 can be respectively arranged on the first and the second arm 240, 245, wherein the second latching lugs 380 on the first arm 240 each extend in an opposite direction. Similarly, the third latching lugs 385 on the second arm 245 extend in opposite directions.

Figure 20:
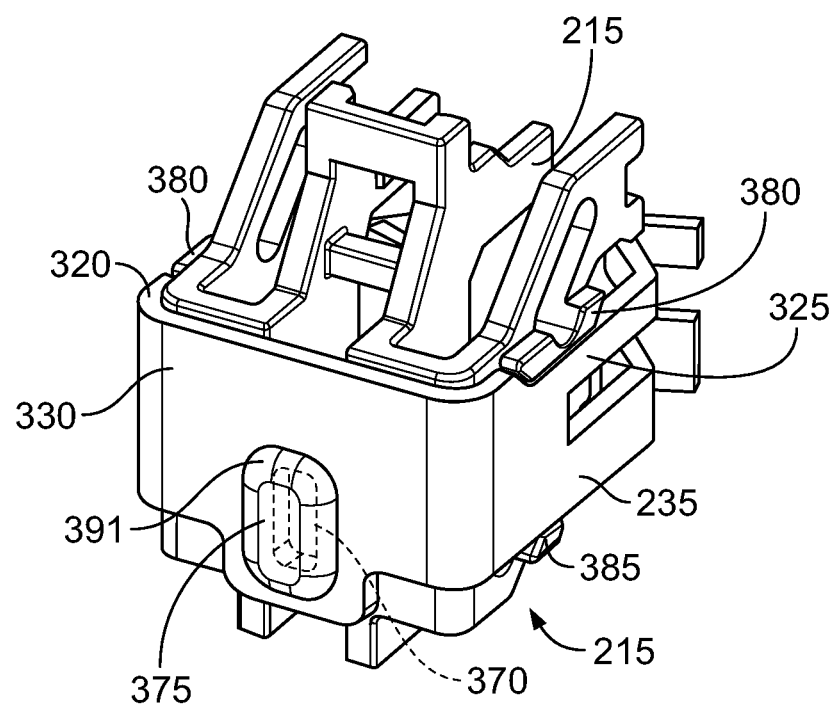
FIG. 20 is a perspective view of the securing element of FIG. 18 on the sensor holder of FIG. 19 in a mounted state.

FIG. 20 shows a perspective illustration of the securing element 235, shown in FIG. 18, on the sensor holder 215, shown in FIG. 19, in the mounted state. In the mounted state (that is to say the sensor holder 215 is in the second position), the rib 375 passes through the fourth cutout 370, wherein the rib 375 is hot-caulked, so that the rib 375 engages behind the fastening section 330 on a side that is opposite from the sensor receptacle 220 by a head 391 which is produced by hot-caulking, so that the sensor holder 215 and the securing element 235 are connected to one another in an interlocking manner, wherein this connection can be released only by destroying the rib 375.

At the top side, the second latching lug 380 bears against the securing section 320, 325 and prevents the sensor holder 215 from being displaced in the axial direction relative to the securing element 235. In order to provide effective bearing, the securing arm 230, 235 can be designed so as to taper in a corresponding manner in relation to the design of the second latching lug 380 at least in the region of the second latching lug 380. Similarly, a displacement in the axial direction is blocked by way of the third latching lug 385 respectively bearing at the bottom side against the securing section 320, 325.

Figure 21:
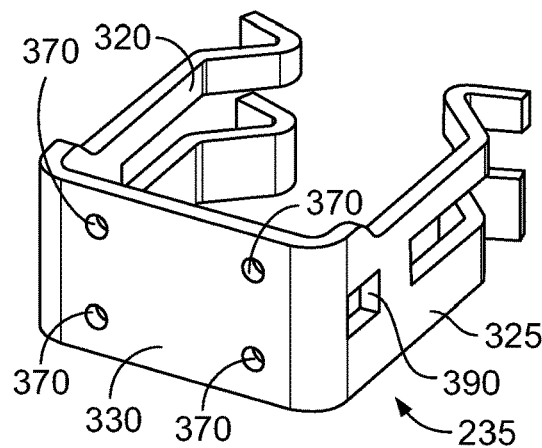
FIG. 21 is a perspective view of a securing element according to a third embodiment.

FIG. 21 shows a perspective illustration of a securing element 235 according to a third embodiment. The securing element 235 is configured in a substantially identical manner to the securing element 235 described in FIGS. 18 and 20. Only the differences between the securing element 235 shown in FIG. 21 and the securing element 235 described in FIGS. 18 and 20 will be discussed in the text which follows.

The fastening section 330 substantially exhibits a constant height in the embodiment shown in FIG. 21, wherein, instead of the elongate hole-like design of the fourth embodiment 370 shown in FIG. 18, a plurality of fourth cutouts 370 are arranged in the fastening section 330, which cutouts are configured as a bore by way of example. The fourth cutouts 370 are arranged at a distance from one another in the fastening section 330 in this case. On the sides, the securing section 320, 325 respectively comprises a latching receptacle 390 which is rectangular by way of example, wherein the latching receptacles 390 are arranged opposite one another in each case in the first and the second securing section 320, 325.

Figure 22:
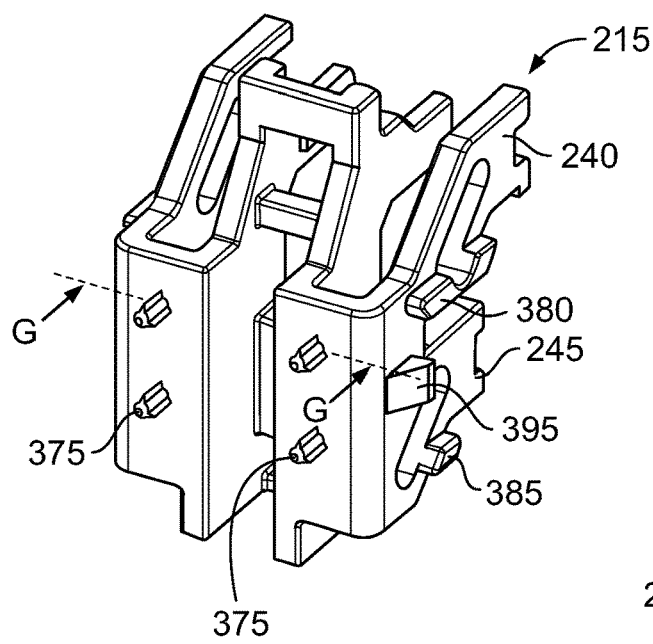
FIG. 22 is a perspective view of a sensor holder according to a third embodiment.

FIG. 22 shows a perspective illustration of a sensor holder 215 according to a third embodiment. The sensor holder 215 is configured in a substantially identical manner in relation to the sensor holder 215 shown in FIGS. 19 and 20. In addition, the sensor holder 215 comprises a fourth latching lug 395 which is arranged on the side of the first and/or the second arm 240, 245 and is arranged between the second latching lug 380 and the third latching lug 385 in the vertical direction. The fourth latching lug 395 is configured in a wedge-like or lug-like manner. In a manner corresponding to the arrangement of the fourth cutout 370, the sensor holder 215 comprises a plurality of ribs 375, wherein the ribs 375 are each configured as a pinch rib.

Figure 23:
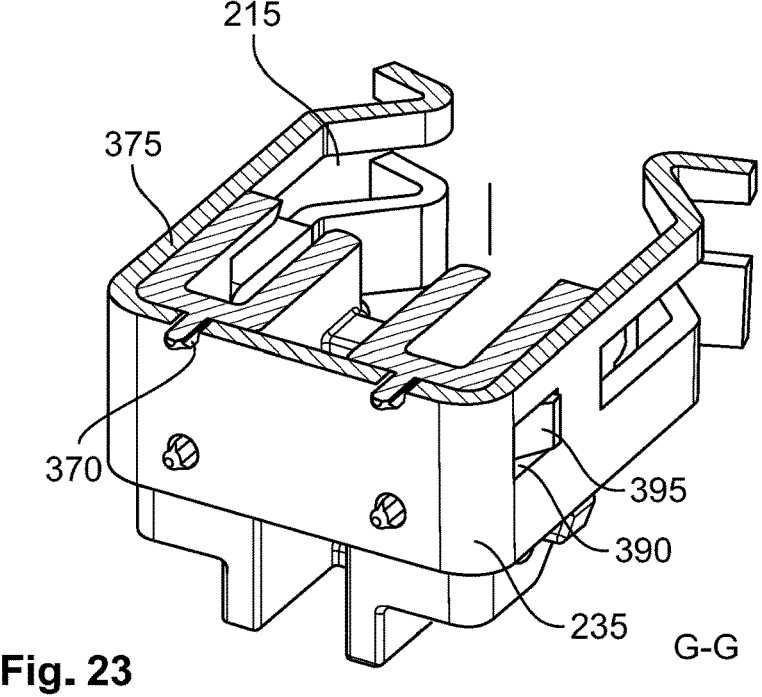
FIG. 23 is a sectional perspective view of the securing element of FIG. 21 on the sensor holder of FIG. 22 in a mounted state, taken along plane G-G of FIG. 22.

FIG. 23 shows a sectional view along a sectional plane G-G, shown in FIG. 22, through the securing element 235 in the mounted state on the sensor holder 215. The rib 375 respectively passes through the fourth cutout 370, wherein, when the rib 375 is inserted into the fourth cutout 370, the rib 375 is pinched at the circumference and thereby connects the sensor holder 215 to the securing element 235 in an interlocking manner and with a friction fit. Furthermore, in the mounted state, the fourth latching lug 395 engages into the latching receptacle 390 and prevents the securing element 235 from being unintentionally pulled out from the sensor holder 215 in the axial direction by way of the fourth latching lug 395 stopping against the latching receptacle 390.

FIG. 24 shows a perspective illustration of a securing element 235 according to a fourth embodiment. The securing element 235 is substantially a combination of the securing elements 235 shown in FIGS. 18, 20, 21 and 23. Only the differences between the securing element 235 shown in FIG. 23 and the securing element 235 described in FIGS. 18, 20, 21 and 23 will be discussed in the text which follows.

In FIG. 24, the securing section 320, 325, in contrast to the design shown in FIG. 18, is not tapered at the top side, and therefore the securing section 320, 325 substantially exhibits a constant height. The latching receptacle 390 shown in FIGS. 21 and 23 is arranged in the securing section 320, 325. Furthermore, the fourth cutout 370 in FIG. 24 is not configured as a passage opening but rather as a groove in the fastening section 330. The fourth cutout 370 is arranged, for example, on a side of the fastening section 330 that faces the securing section 320, 325.

FIG. 25 shows a perspective illustration of a sensor holder 215 according to a fourth embodiment. The sensor holder 215 is configured in a substantially identical manner to the sensor holder 215 shown in FIGS. 19, 20, 22 and 23. Only the differences between the sensor holder 215 shown in FIG. 25 and the sensor holder 215 shown in FIGS. 19, 20, 22 and 23 will be discussed in the text which follows.

As shown in FIG. 25, the rib 375 extends substantially over the entire extent in the axial direction of the further holding section 290 and is oriented so as to run parallel in relation to the rotation axis 25. Furthermore, the third latching lug (as shown in FIG. 19) is dispensed with in FIG. 25. The second latching lug 380 and the fourth latching lug 395, shown in FIGS. 22 and 23, are provided. In this case, the fourth latching lug 395 is arranged in a manner rotated through 90° in relation to the fourth latching lug shown in FIGS. 22 and 23, so that the fourth latching lug 395 runs substantially parallel in relation to the rotation axis 25.

FIG. 26 shows a perspective illustration of the securing element 235, shown in FIG. 24, on the sensor holder 215, shown in FIG. 25, in the mounted state. In the mounted state, the rib 375 engages into the fourth cutout 370 and connects the sensor holder 215 to the securing element 235 in an interlocking manner. In this case, the rib 375 can be pinched during insertion, that is to say when the sensor holder 215 and the securing element 235 are pushed one onto the other parallel in relation to the rotation axis 25, so that the sensor holder 215 and the securing element 235 are connected to one another in a force-fitting manner.

Furthermore, the second latching lug 380 bears against the securing section 320, 325 at the top side of the securing section 320, 325. Furthermore, the fourth latching lug 395 engages into the latching receptacle 390 and prevents axial displacement of the securing element 235 relative to the sensor holder 215 by way of the fourth latching lug 395 stopping against the latching receptacle 390. The movement in the upward direction is blocked by the securing section 320, 325 stopping against the second latching lug 380.

In addition or as an alternative, the securing element 235 comprises a further latching lug, wherein, in the first position, the latching lug is arranged at a distance from the sensor holder 215 and unintentional release of the sensor holder 215 from the carrier 55 in the second position of the sensor holder 215 is prevented by way of the further latching lug stopping against the sensor holder 215. To this end, the sensor holder 215 can comprise a further latching receptacle into which the further latching lug engages and/or the further latching lug can be arranged on the securing element 235 in such a way that the further latching lug bears against the top side or the bottom side of the sensor holder 215.

What is claimed is:

1. A measurement system for an electrical machine, comprising:
   a position sensor device arranged on a rotor of the electrical machine and configured to ascertain an item of information about an orientation of the rotor;
   a carrier connected to the position sensor device;
   a temperature sensor device fastened to the carrier, the temperature sensor is configured to ascertain a temperature of a stator of the electrical machine, the carrier having a holding section and a sensor holder, the holding section delimiting a sensor receptacle, and sensor holder is fastened such that it can be displaced between a first position and a second position on the holding section,
   wherein moving the measurement system and/or the stator toward one another along a mounting axis, the stator bears against the sensor holder and displaces the sensor holder from the first position to the second position, the sensor holder fastens the temperature sensor device to the stator in the second position.

2. The measurement system of claim 1, wherein the temperature sensor device is arranged in the sensor receptacle, the sensor holder is configured, at least in the second position, to fix the temperature sensor device in the sensor receptacle.

3. The measurement system of claim 2, further comprising a securing element having a fastening section and a first securing section, the sensor holder is arranged between the holding section and the fastening section, the first securing section is arranged laterally on the sensor holder and the holding section and engages behind the holding section on a side opposite from the sensor holder and secures the sensor holder in the second position on the holding section.

4. The measurement system of claim 3, wherein the securing element has a U-shaped configuration and has a second securing section arranged offset in relation to the first securing section, the first securing section and the second securing section are arranged on either side of the fastening section and the second securing section engages behind the sensor holder.

5. The measurement system of claim 3, wherein the sensor holder has a latching lug on an outside of the sensor holder, unintentional release of the sensor holder from the carrier in the second position of the sensor holder is prevented by the latching lug stopping against the securing element.

6. The measurement system of claim 3, wherein the securing element has a latching lug, unintentional release of the sensor holder from the carrier in the second position of the sensor holder is prevented by the latching lug stopping against the sensor holder.

7. The measurement system of claim 3, wherein the holding section has a sliding surface, the sensor holder has a further sliding surface and an operating web oriented in an inclined manner relative to a mounting axis.

8. The measurement system of claim 7, wherein the sliding surface bears against the further sliding surface, and the sliding surface and the further sliding surface are oriented obliquely in relation to the mounting axis, the sensor holder is configured to slide, by way of the further sliding surface, along the sliding surface to move the sensor holder from the first position to the second position.

9. The measurement system of claim 1, further comprising a contact device fastened to the carrier, the contact device is electrically connected to the temperature sensor device by a first electrical connection and to the position sensor device by a second electrical connection, the first electrical connection and/or the second electrical connection is arranged on the carrier.

10. The measurement system of claim 9, further comprising a holder connected to the carrier, the holder delimits a receptacle configured, at least in sections, to correspond to an outer circumferential side of the contact device, the contact device engages into the receptacle and the holder mechanically fastens the contact device to the carrier.

11. The measurement system of claim 9, wherein the carrier has a connection receptacle arranged between the position sensor device and the temperature sensor device and configured in the form of a cage, the first electrical connection and/or the second electrical connection is arranged in the connection receptacle.

12. The measurement system of claim 1, wherein the position sensor device includes a coil rim, the carrier has a first carrier section with a curved configuration, the first carrier section and the coil rim run parallel in relation to one another, and the first carrier section is mechanically connected to the coil rim.

13. The measurement system of claim 12, wherein the carrier has a second carrier section connected, radially on an inside, to the first carrier section and extending away from the first carrier section radially to an outside.

14. The measurement system of claim 13, wherein the holding section is fastened to the second carrier section radially on the outside of the second carrier section, the second carrier section delimits a connection receptacle between the position sensor device and the temperature sensor device.

15. The measurement system of claim 12, further comprising a fastening device having a latching element and a fastening opening arranged in the coil rim, the latching element is connected to the carrier and passes through the fastening opening.

16. The measurement system of claim 15, wherein, with an end side of the carrier bearing against the coil rim, the latching element engages behind the coil rim and connects the carrier to the coil rim in an interlocking manner.

17. An electrical machine, comprising:
a stator;
a rotor mounted to rotate about a rotation axis; and
a measurement system arranged axially next to the stator, the measurement system including a position sensor device arranged on the rotor and configured to ascertain an item of information about an orientation of the rotor, a carrier connected to the position sensor device the carrier having a holding section and a sensor holder, the holding section delimiting a sensor receptacle, and sensor holder is fastened such that it can be displaced between a first position and a second position on the holding section, and a temperature sensor device fastened to the carrier, the temperature sensor is thermally coupled to the stator and is configured to ascertain a temperature of the stator,
wherein moving the measurement system and/or the stator toward one another along a mounting axis, the stator bears against the sensor holder and displaces the sensor holder from the first position to the second position, and the sensor holder fastens the temperature sensor device to the stator in the second position.

18. The electrical machine of claim 17, wherein the stator has a stator element extending parallel to a mounting axis, the stator element is a stator lug configured in a plate-like manner, the temperature sensor device bears against the stator element.

19. A method for assembling an electrical machine, comprising:
providing a stator with a stator element;
providing a measurement system including a position sensor device, a carrier connected to the position sensor device, and a temperature sensor device fastened to the carrier, the temperature sensor is configured to ascertain a temperature of the stator, the carrier has a holding section and a sensor holder, the holding section delimits a sensor receptacle, the sensor holder is.

* * * * *